US012802259B2

(12) United States Patent
Furubayashi et al.

(10) Patent No.: US 12,802,259 B2
(45) Date of Patent: Nov. 17, 2026

(54) INFORMATION PROCESSING APPARATUS, INFORMATION PROCESSING METHOD, AND INFORMATION PROCESSING PROGRAM

(71) Applicant: FUJIFILM Corporation, Tokyo (JP)

(72) Inventors: Taku Furubayashi, Saitama (JP); Tomoki Otsuki, Saitama (JP); Koki Hojo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 310 days.

(21) Appl. No.: 18/584,939

(22) Filed: Feb. 22, 2024

(65) Prior Publication Data

US 2024/0233168 A1 Jul. 11, 2024

Related U.S. Application Data

(63) Continuation of application No. PCT/JP2022/025910, filed on Jun. 29, 2022.

(30) Foreign Application Priority Data

Aug. 27, 2021 (JP) ................................ 2021-139098

(51) Int. Cl.
*G06T 7/70* (2017.01)
*G06F 3/14* (2006.01)
(Continued)

(52) U.S. Cl.
CPC .................. *G06T 7/70* (2017.01); *G06F 3/14* (2013.01); *G06T 3/40* (2013.01); *G06T 5/50* (2013.01);
(Continued)

(58) Field of Classification Search
None
See application file for complete search history.

(56) References Cited

U.S. PATENT DOCUMENTS 9,386,212 B2 7/2016 Sako et al.
9,635,249 B2 4/2017 Kimura et al.
(Continued)

FOREIGN PATENT DOCUMENTS

JP 2006203863 8/2006
JP 2006238082 9/2006
(Continued)

OTHER PUBLICATIONS

"International Search Report (Form PCT/ISA/210) of PCT/JP2022/025910," mailed on Sep. 13, 2022, with English translation thereof, pp. 1-5.
(Continued)

*Primary Examiner* — Anand P Bhatnagar
(74) *Attorney, Agent, or Firm* — JCIPRNET

(57) ABSTRACT

An information processing apparatus, an information processing method, and an information processing program that can acquire information for imaging a desired subject with desired composition are provided. An information processing apparatus includes a processor, in which the processor is configured to acquire information about an imaging apparatus and information about a first subject and a second subject to be set as an imaging target, and perform a control of estimating an imaging position at which the first subject and the second subject are imageable based on display states of a first image representing the first subject and a second image representing the second subject on a display device and/or another display device.

22 Claims, 39 Drawing Sheets

(51) Int. Cl.
*G06T 3/40* (2006.01)
*G06T 5/50* (2006.01)
*G06T 7/62* (2017.01)

(52) U.S. Cl.
CPC ...... *G06T 7/62* (2017.01); *G06T 2207/20221* (2013.01)

(56) References Cited

U.S. PATENT DOCUMENTS

| | | | | |
|---|---|---|---|---|
| 9,712,760 | B2 | 7/2017 | Furuhashi | |
| 9,967,458 | B2 | 5/2018 | Kimura et al. | |
| 10,470,825 | B2 * | 11/2019 | Gallop | A61B 34/10 |
| 11,045,261 | B2 * | 6/2021 | Gallop | G06T 17/00 |
| 11,315,313 | B2 * | 4/2022 | Michielin | G06T 15/04 |
| 11,348,682 | B2 * | 5/2022 | Wolf | G06V 20/48 |
| 11,741,618 | B2 * | 8/2023 | Boardman | G06T 17/205 382/100 |
| 12,033,104 | B2 * | 7/2024 | Wolf | G06N 3/047 |
| 2011/0018864 | A1 * | 1/2011 | Ishibashi | G06T 15/00 345/419 |
| 2013/0083174 | A1 * | 4/2013 | Sakurabu | H04N 13/239 348/51 |
| 2015/0371088 | A1 * | 12/2015 | Hao | G06T 7/246 382/103 |
| 2020/0038118 | A1 * | 2/2020 | Gallop | A61B 34/25 |
| 2020/0412943 | A1 * | 12/2020 | Lanka | H04N 23/631 |

FOREIGN PATENT DOCUMENTS

| | | | | |
|---|---|---|---|---|
| JP | 2006238082 | A * | 9/2006 | H04N 5/232 |
| JP | 2009239397 | | 10/2009 | |
| JP | 2014192743 | | 10/2014 | |
| JP | 2017011469 | | 1/2017 | |
| JP | 2020017912 | | 1/2020 | |
| WO | 2013179742 | | 12/2013 | |
| WO | 2014178228 | | 11/2014 | |

OTHER PUBLICATIONS

"International Preliminary Report on Patentability (Form PCT/IPEA/409) of PCT/JP2022/025910," completed on Aug. 10, 2023, with English translation thereof, pp. 1-6.
"Notice of Reasons for Refusal of Japan Counterpart Application", issued on Nov. 19, 2025, with English translation thereof, p. 1-p. 8.

* cited by examiner

INFORMATION PROCESSING APPARATUS, INFORMATION PROCESSING METHOD, AND INFORMATION PROCESSING PROGRAM

CROSS-REFERENCE TO RELATED APPLICATIONS

The present application is a Continuation of PCT International Application No. PCT/JP2022/025910 filed on Jun. 29, 2022 claiming priority under 35 U.S.C § 119(a) to Japanese Patent Application No. 2021-139098 filed on Aug. 27, 2021. Each of the above applications is hereby expressly incorporated by reference, in its entirety, into the present application.

BACKGROUND OF THE INVENTION

1. Field of the Invention

The present invention relates to an information processing apparatus, an information processing method, and an information processing program, and particularly to an information processing apparatus, an information processing method, and an information processing program for processing information for imaging a desired subject with desired composition.

2. Description of the Related Art

JP2020-017912A discloses an imaging apparatus that displays an icon resembling a subject on a display unit, sets composition on a screen using the icon, calculates a distance in which the subject can be imaged with the set composition, and presents the calculated distance to a user.

SUMMARY OF THE INVENTION

One embodiment according to the disclosed technology provides an information processing apparatus, an information processing method, and an information processing program that can acquire information for imaging a desired subject with desired composition.

(1) An information processing apparatus comprises a processor, in which the processor is configured to acquire information about an imaging apparatus and information about a first subject and a second subject to be set as an imaging target, and perform a control of estimating an imaging position at which the first subject and the second subject are imageable based on display states of a first image representing the first subject and a second image representing the second subject on a display device and/or another display device.

(2) In the information processing apparatus according to (1), the processor is configured to perform a control of displaying information about the estimated imaging position on the display device and/or the other display device.

(3) In the information processing apparatus according to (1) or (2), the processor is configured to receive input of composition of the first image and the second image on the display device and/or the other display device, and perform a control of estimating the imaging position in the composition of which input is received.

(4) In the information processing apparatus according to (3), the composition is a position and a size of the first image and a position and a size of the second image on the display device and/or the other display device.

(5) In the information processing apparatus according to any one of (1) to (4), the information about the first subject and the second subject is information about positions and sizes of the first subject and the second subject.

(6) In the information processing apparatus according to (5), the information about the position of the first subject and/or the information about the position of the second subject is information about an altitude and an azimuth of the first subject and/or information about an altitude and an azimuth of the second subject.

(7) In the information processing apparatus according to (5), the processor is configured to receive input of information for specifying the first subject and the second subject, and perform a control of acquiring the information about the position and the size of the specified first subject and the information about the position and the size of the specified second subject from a database.

(8) In the information processing apparatus according to (5), the processor is configured to perform a control of acquiring information obtained by measuring the position and the size of the first subject and the position and the size of the second subject.

(9) In the information processing apparatus according to any one of (1) to (8), the processor is configured to acquire information about a current location, generate guidance information for leading to the imaging position based on the acquired information about the current location, and perform a control of displaying the generated guidance information on the display device and/or the other display device.

(10) In the information processing apparatus according to any one of (1) to (9), the processor is configured to calculate a time slot in which backlight and/or insufficiency of a light quantity occurs in a case of imaging the first subject and the second subject at the imaging position, and perform a control of displaying the calculated time slot or a time slot excluding the calculated time slot on the display device and/or the other display device.

(11) In the information processing apparatus according to (3) or (4), the processor is configured to, in a case where the imaging position is not estimable, perform a control of performing correction to the composition in which the imaging position is estimable.

(12) In the information processing apparatus according to (3) or (4), the processor is configured to perform a control of displaying a frame having the same aspect ratio as an image captured by the imaging apparatus on the display device and/or the other display device.

(13) In the information processing apparatus according to (12), the processor is configured to, in a case where the imaging position is not estimatable because sizes of the first image and the second image in the composition of which input is received are unsuitable, perform a control of performing correction to the composition in which the imaging position is estimatable by changing the size of the first image and the size of the second image within the frame and/or a front and rear positional relationship.

(14) In the information processing apparatus according to (12) or (13), the processor is configured to, in a case where the imaging position is not estimatable because a front and rear positional relationship between the first image and the second image in the composition of which input is received is unsuitable, perform a control of performing correction to the composition in which the imaging position is estimatable by changing a size of the first image and a size of the second image within the frame and/or the front and rear positional relationship.

(15) In the information processing apparatus according to any one of (12) to (14), the processor is configured to, in a case where the imaging position is not estimatable because a distance between the first image and the second image in the composition of which input is received are unsuitable, perform correction to the composition in which the imaging position is estimatable by changing the distance between the first image and the second image within the frame.

(16) In the information processing apparatus according to any one of (12) to (15), the processor is configured to detect an obstacle in a case of imaging the first subject and the second subject at the estimated imaging position, and in a case where the obstacle is detected, perform a control of performing correction to the composition in which the first subject and the second subject are imageable by avoiding the obstacle.

(17) In the information processing apparatus according to any one of (1) to (16), the processor is configured to determine whether or not the estimated imaging position is an enterable location, and perform a control of issuing an alert in a case where the estimated imaging position is an unenterable location.

(18) In the information processing apparatus according to any one of (1) to (17), the imaging position includes information about an altitude.

(19) In the information processing apparatus according to any one of (1) to (18), the processor is configured to determine whether or not the estimated imaging position is a reachable position, and perform a control of issuing an alert in a case where the estimated imaging position is an unreachable position.

(20) In the information processing apparatus according to (12), the processor is configured to further perform a control of receiving input of directions of the first image and the second image within the frame.

(21) An information processing method comprises a step of acquiring information about an imaging apparatus and information about a first subject and a second subject to be set as an imaging target, and a step of estimating an imaging position at which the first subject and the second subject are imageable based on display states of a first image representing the first subject and a second image representing the second subject on a display device and/or another display device.

(22) An information processing program causes a computer to implement a function of acquiring information about an imaging apparatus and information about a first subject and a second subject to be set as an imaging target, and a function of estimating an imaging position at which the first subject and the second subject are imageable based on display states of a first image representing the first subject and a second image representing the second subject on a display device and/or another display device.

DESCRIPTION OF THE PREFERRED EMBODIMENTS

Hereinafter, preferred embodiments of the present invention will be described in detail in accordance with the accompanying drawings.

First Embodiment

A case where the present invention is applied to a system (imaging position estimation system) that estimates and presents a position (imaging position) at which a desired subject can be imaged with desired composition will be illustratively described. The "imaging position" is a geographical position.

The subject to be set as an imaging target is limited to a subject of which a position can be specified at at least a time of imaging. Accordingly, the subject as the imaging target can include even a moving subject of which the position at the time of imaging can be specified. The "position" is a geographical position.

In the following description of the imaging position estimation system, a case where two subjects are selected and imaged with the desired composition will be illustratively described.

System Configuration

Figure 1:
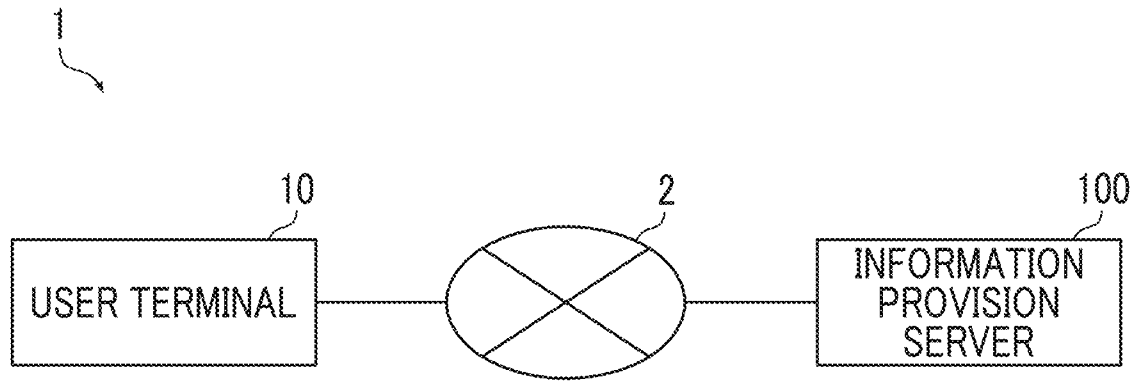
FIG. 1 is a diagram illustrating a schematic configuration of an imaging position estimation system.

FIG. 1 is a diagram illustrating a schematic configuration of the imaging position estimation system.

As illustrated in FIG. 1, an imaging position estimation system 1 of the present embodiment comprises a user terminal 10 and an information provision server 100. The user terminal 10 and the information provision server 100 are connected to be capable of communicating with each other through a network 2.

User Terminal

The user terminal 10 is composed of a portable terminal, particularly a camera-equipped portable terminal. In a case where the user terminal 10 is a camera-equipped information terminal, imaging is performed by the camera comprised in the information terminal. In the present embodiment, a case where the user terminal 10 is composed of a camera-equipped smartphone will be described.

Figure 2:
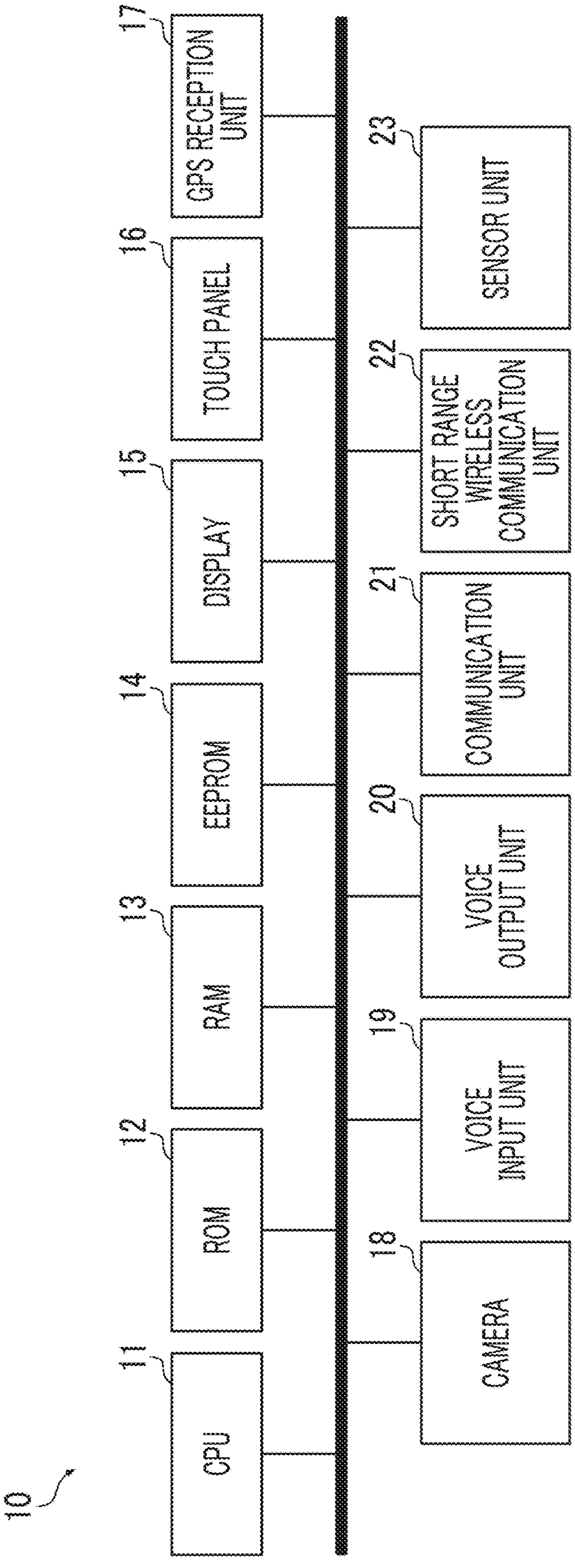
FIG. 2 is a block diagram illustrating an example of a hardware configuration of a user terminal.

FIG. 2 is a block diagram illustrating an example of a hardware configuration of the user terminal.

As illustrated in FIG. 2, the user terminal 10 comprises a central processing unit (CPU) 11 that controls an overall operation, a read only memory (ROM) 12 that stores a basic input-output program and the like, a random access memory (RAM) 13 used as a work area of the CPU 11, an electrically erasable and programmable ROM (EEPROM) 14 that stores various programs executed by the CPU 11 and various types of data and the like, a display 15, a touch panel 16 that detects a touch operation on a display screen, a GPS reception unit 17 that receives a global positioning systems (GPS) signal, a camera 18 that electronically captures an image, a voice input unit 19 that inputs voice, a voice output unit 20 that outputs voice, a communication unit 21 that wirelessly communicates with a nearest base station and the like, a short range wireless communication unit 22 that performs short range wireless communication with an external apparatus, a sensor unit 23, and the like.

The sensor unit 23 comprises various sensors such as a geomagnetic sensor, a gyrocompass, an acceleration sensor, and a range measurement sensor. The range measurement sensor is a two-dimensional scan-type optical distance sensor that measures a distance to a detection object while scanning light. The range measurement sensor includes a laser scanner, a laser range finder (LRF), light detection and ranging or laser imaging detection and ranging (LIDAR), and the like. By providing the range measurement sensor, a space can be three-dimensionally scanned.

The camera 18 is a so-called digital camera and comprises a lens, an image sensor, and the like. In the present embodiment, the camera 18 is assumed to have a zoom function. The camera 18 is an example of an imaging apparatus. In addition, the CPU 11 is an example of a processor. The display 15 is an example of a display device.

Figure 3:
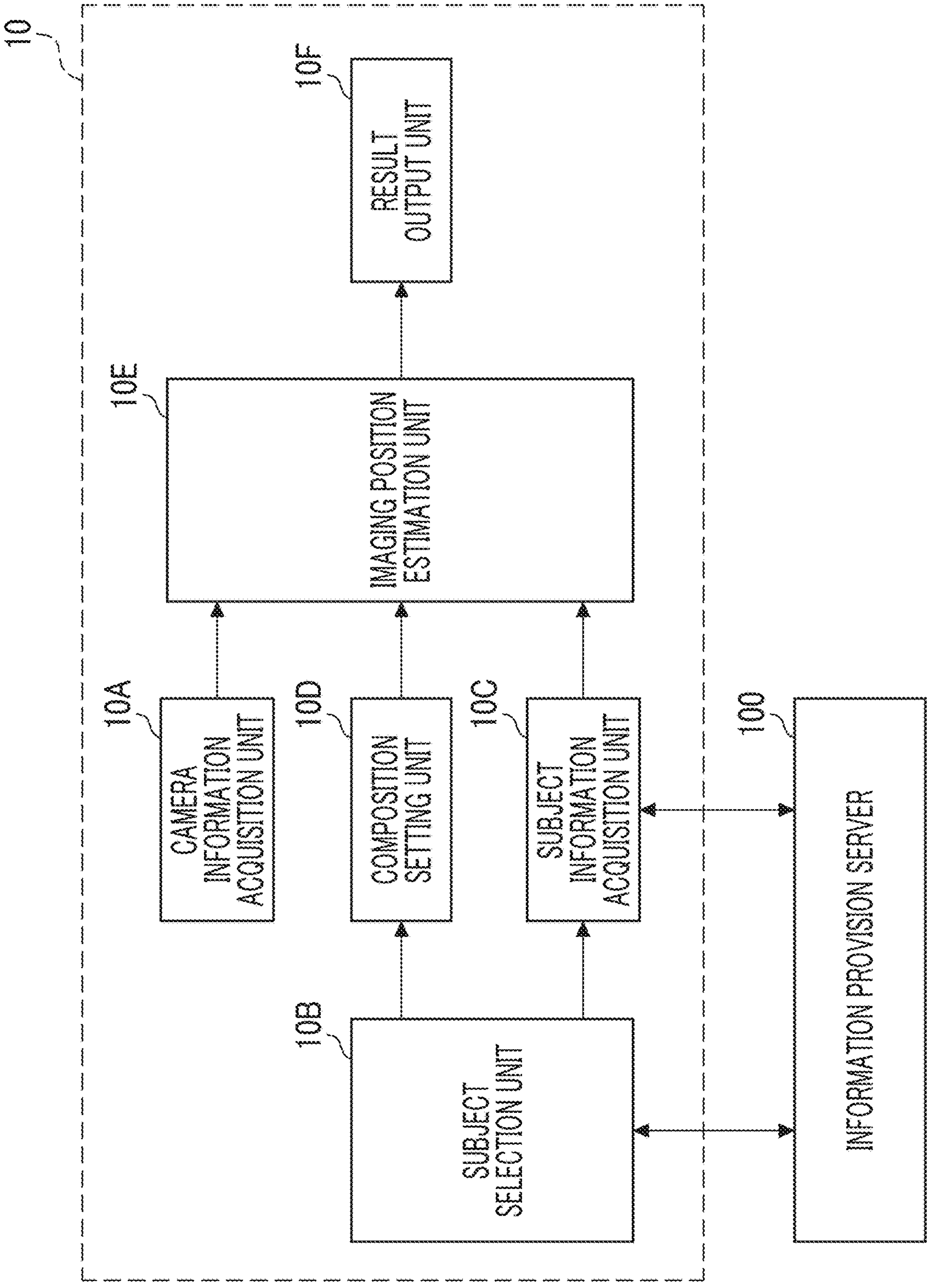
FIG. 3 is a block diagram of main functions implemented by the user terminal.

FIG. 3 is a block diagram of main functions implemented by the user terminal.

As illustrated in FIG. 3, the user terminal 10 has functions of a camera information acquisition unit 10A, a subject selection unit 10B, a subject information acquisition unit 10C, a composition setting unit 10D, an imaging position estimation unit 10E, a result output unit 10F, and the like. Functions of each unit are implemented by executing a predetermined program via the CPU 11.

The camera information acquisition unit 10A performs processing of acquiring information (camera information) about the camera required for estimating the imaging position. The camera information includes information about a size of an image sensor, information about a settable focal length of a lens, and the like. As described above, in the present embodiment, imaging is performed by the camera 18 comprised in the user terminal 10. Accordingly, in the present embodiment, the camera information of the camera 18 comprised in the user terminal 10 is acquired. This information is stored in the ROM 12 and/or the EEPROM 14. The camera information acquisition unit 10A acquires the camera information from the ROM 12 and/or the EEPROM 14. The acquired camera information is provided to the imaging position estimation unit 10E.

The subject selection unit 10B performs processing of receiving selection of the subject to be set as the imaging target. In the present embodiment, selection of the subject is received using a map.

Figure 4:
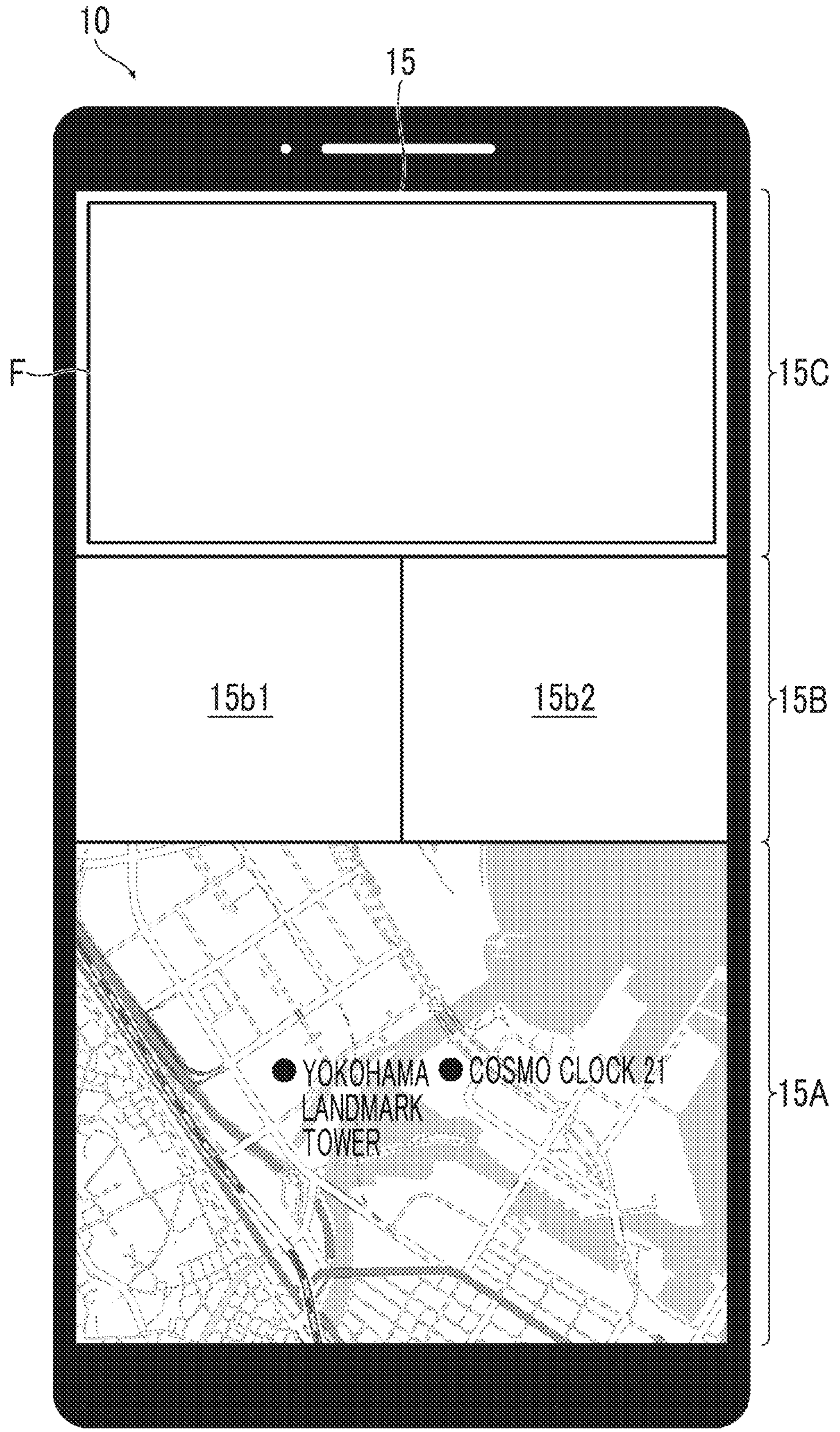
FIG. 4 is a diagram illustrating an example of a selection screen of a subject.

FIG. 4 is a diagram illustrating an example of a selection screen of the subject.

As illustrated in FIG. 4, the subject selection unit 10B displays a map M for selecting the subject on the display 15. The map M is displayed in a predetermined map display region 15A set within the screen of the display 15.

The map M displayed in the map display region 15A is enlarged by a pinch-out operation and is shrunk by a pinch-in operation. In addition, the map M displayed in the map display region 15A is moved in an operation direction by a swipe operation.

The subject selection unit 10B acquires data of the map M from the information provision server 100 and displays the map M on the display 15.

Figure 5:
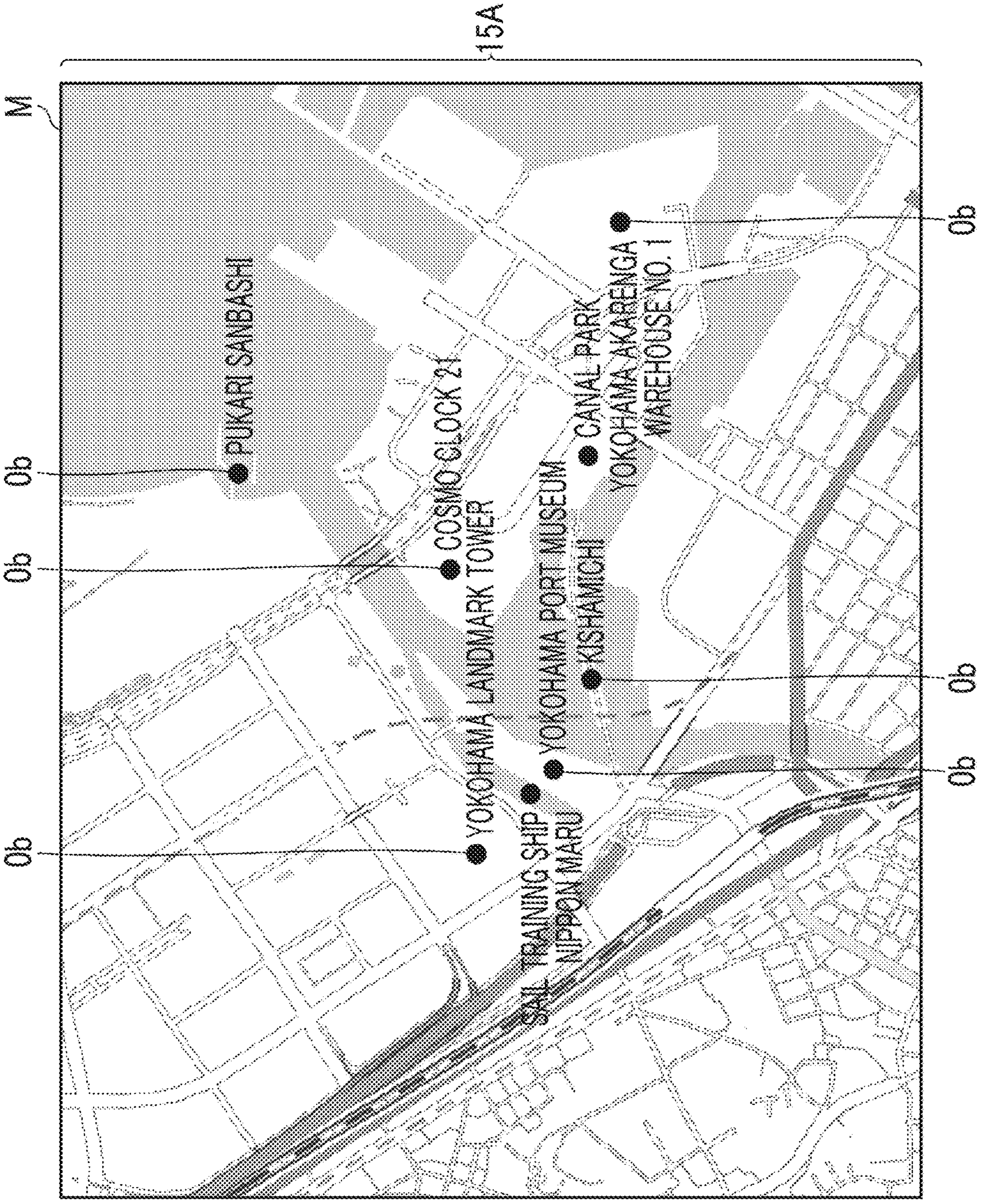
FIG. 5 is a diagram illustrating an example of a map displayed in a map display region.

FIG. 5 is a diagram illustrating an example of the map displayed in the map display region.

As illustrated in FIG. 5, subject candidates Ob that are selectable within the displayed region are displayed on the map M. The subject candidates Ob are displayed with a combination of a dot and a name. Dots are displayed to correspond to locations of the subject candidates Ob on the map M. Since names are also displayed, the subject candidate Ob having a unique name is selected.

A user selects the subject to be set as the imaging target by touching the subject candidate Ob desired to be imaged for a predetermined time period or longer (selects by performing a so-called long press). The subject selection unit 10B receives selection of the subject based on an operation input into the touch panel 16.

In a case where selection processing is confirmed, an icon of the selected subject is displayed in a predetermined information display region 15B set within the screen of the display 15. In the present embodiment, the information display region 15B is set within the same screen as the map display region 15A.

As described above, two subjects are selected in the imaging position estimation system 1 of the present embodiment. Accordingly, two icons are displayed in the information display region 15B.

Figure 6:
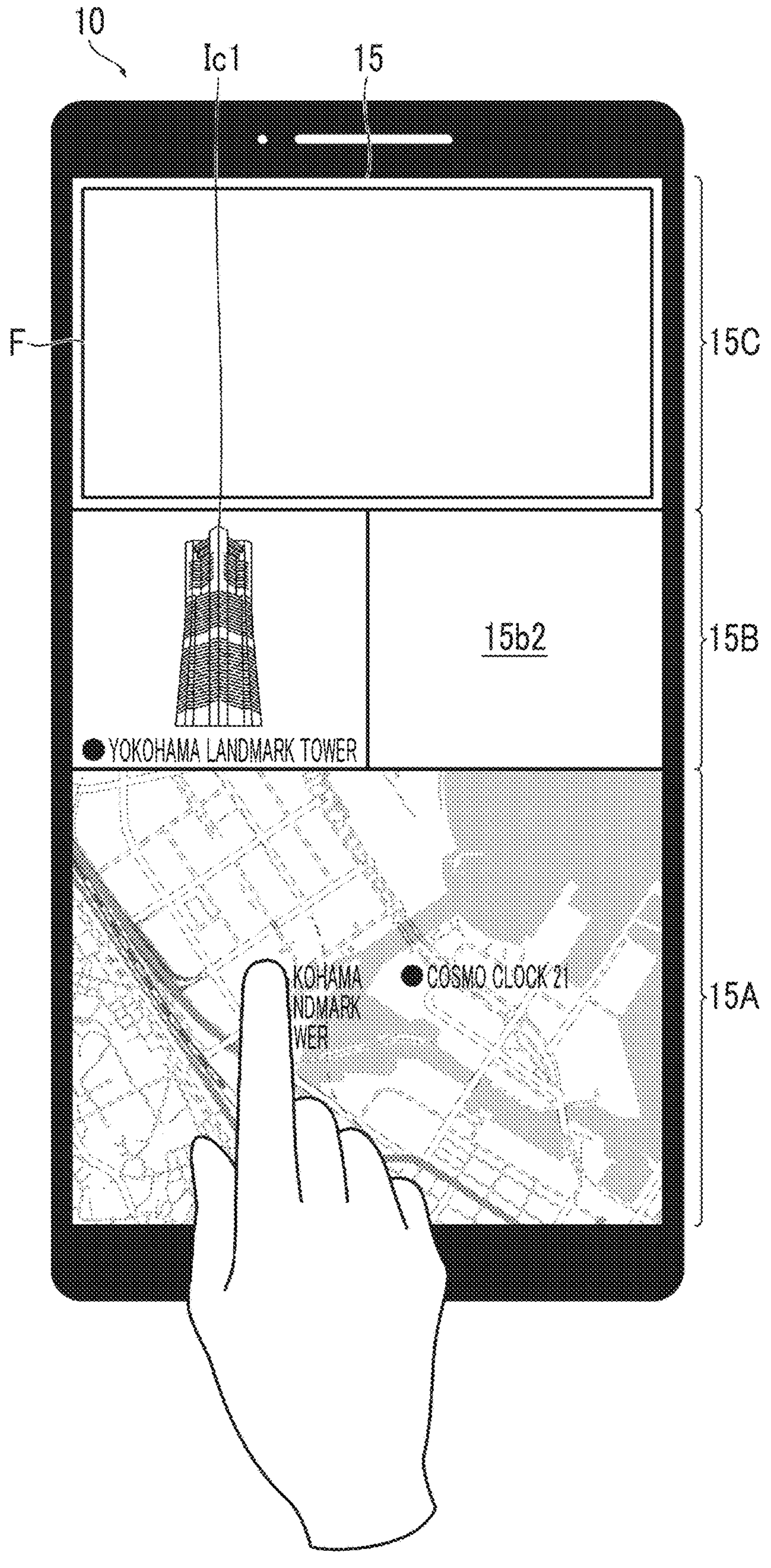
FIG. 6 is a diagram illustrating an example of screen display in a case where selection of the subject in the first place is received.

FIG. 6 is a diagram illustrating an example of screen display in a case where selection of the subject in the first place is received.

As illustrated in FIG. 6, in a case where the subject selection unit 10B receives selection of the subject in the first place (first subject), the subject selection unit 10B displays an icon Ic1 of the received subject in a first icon display region **15*b*1 set within the information display region 15B. In the present embodiment, the name of the selected subject is displayed together with the icon Ic1. The icon Ic1** of the first subject is an example of a first image.

Figure 7:
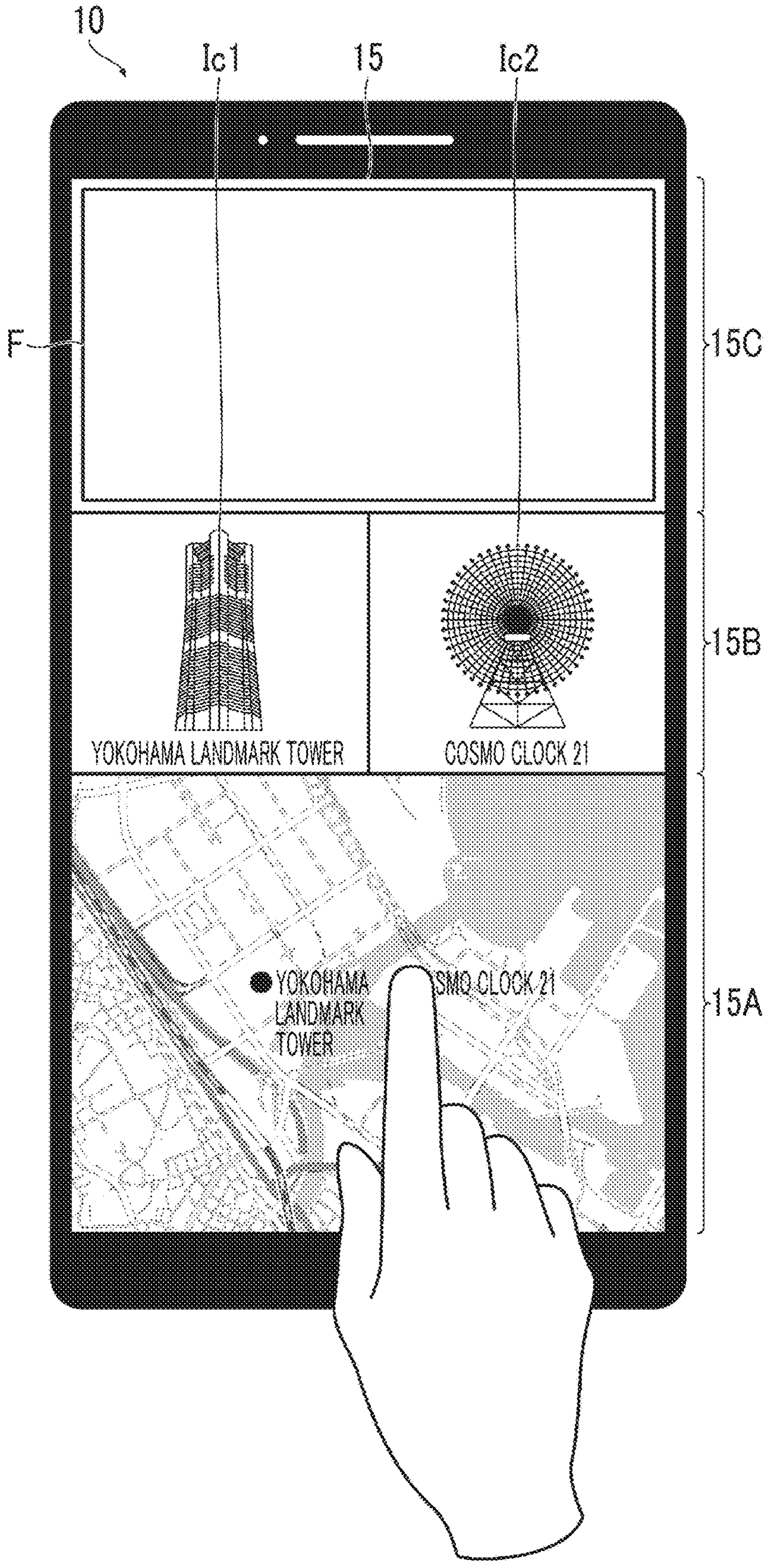
FIG. 7 is a diagram illustrating an example of screen display in a case where selection of the subject in the second place is received.

FIG. 7 is a diagram illustrating an example of screen display in a case where selection of the subject in the second place is received.

As illustrated in FIG. 7, in a case where the subject selection unit 10B receives selection of the subject in the second place (second subject), the subject selection unit 10B displays an icon Ic2 of the received subject in a second icon display region **15*b*2 set within the information display region 15B. In the present embodiment, the name of the selected subject is displayed together with the icon Ic2. The icon Ic2** of the second subject is an example of a second image.

The icon is composed of an image representing the subject. In the present embodiment, the icon is composed of an image that is an illustration of the subject. As will be described later, the icon is used for setting the composition. Accordingly, the icon is preferably composed of an image that reproduces the subject as close as possible. In addition to the image that is an illustration of the subject, an image and the like obtained by cutting out a subject part from an image in which the subject is captured can be used as the icon.

The subject selection unit 10B acquires data of the icon of the selected subject from the information provision server 100 and displays the icon on the display 15.

The subject information acquisition unit 10C performs processing of acquiring information (subject information) about the subject selected by the subject selection unit 10B.

The subject information includes information required for estimating the imaging position. The information required for estimating the imaging position includes information about a position, information about a size, and the like of the subject. The position is a geographical position. The geographical position is specified by, for example, a latitude and a longitude. In the case of specifying the geographical position in more detail, an altitude is included. The information about the size includes at least information about a height of the subject. The subject information acquisition unit 10C acquires the subject information from the information provision server 100. The acquired subject information is provided to the imaging position estimation unit 10E.

The composition setting unit 10D performs processing of receiving input of the composition. The composition to be input is composition in imaging the subject (the first subject and the second subject) selected by the subject selection unit 10B. The composition is input using the icons Ic1 and Ic2 of the subject. In addition, the composition is input in a predetermined composition setting region 15C set within the screen of the display 15. As illustrated in FIG. 4, in the present embodiment, the composition setting region 15C is set within the same screen as the map display region 15A and as the information display region 15B. A frame F having the same aspect ratio as the image captured by the camera 18 is displayed in the composition setting region 15C, and a setting operation of the composition is performed within the frame F. That is, an operation of determining the position and the size of the subject is performed within the frame F.

Figure 8:
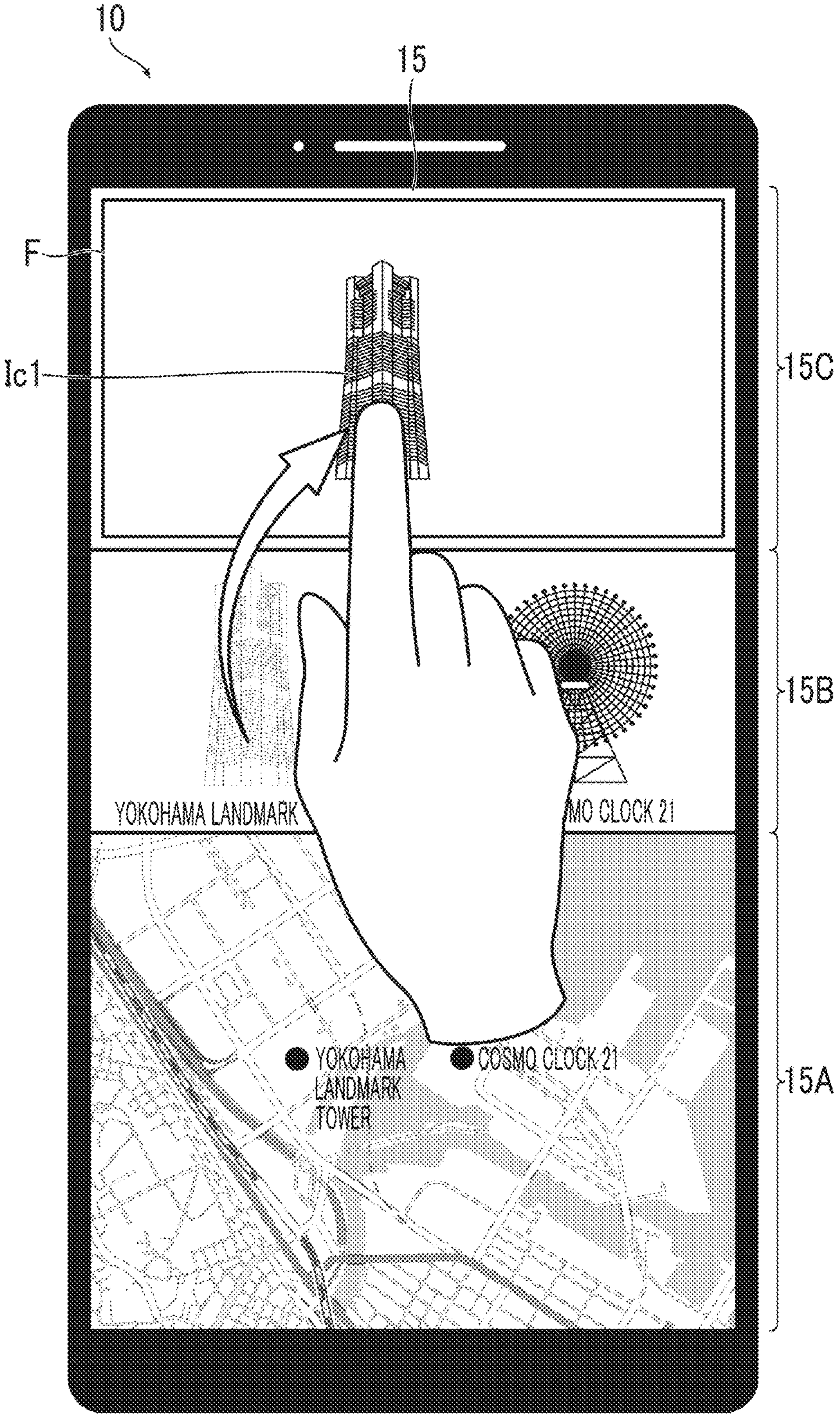
FIG. 8 is a conceptual diagram of an operation of displaying an icon in a composition setting region.

FIG. 8 is a conceptual diagram of an operation of displaying the icon in the composition setting region.

As illustrated in FIG. 8, the icon of the subject to be imaged is displayed in the composition setting region 15C by dragging the icon displayed in the information display region 15B to the composition setting region 15C. FIG. 8 illustrates an example of a case where the icon Ic1 of the first subject is dragged to the composition setting region 15C. The composition setting unit 10D controls display of the display 15 based on an operation input into the touch panel 16.

Figure 9:
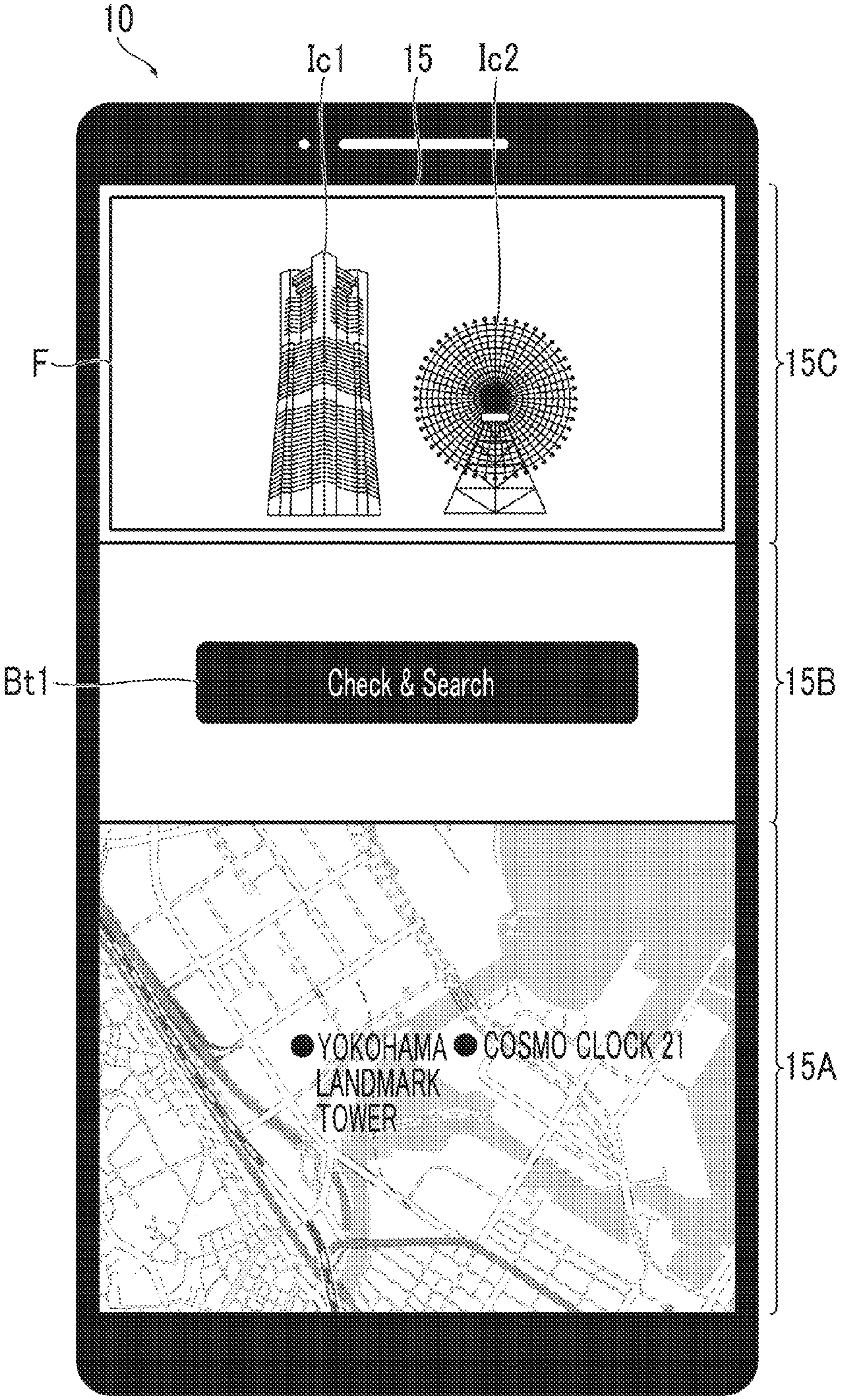
FIG. 9 is a diagram illustrating an example of display of a display after dragging is completed.

FIG. 9 is a diagram illustrating an example of display of the display after dragging is completed.

As illustrated in FIG. 9, in a case where all of the icons Ic1 and Ic2 displayed in the information display region 15B are dragged to the composition setting region 15C, display of the information display region 15B is switched to display a predetermined button (Check & Search button) Bt1. A function of the Check & Search button Bt1 will be described later.

FIG. 10 to FIG. 15 are conceptual diagrams of the setting operation of the composition.

The setting operation of the composition is performed by moving and/or enlarging and shrinking the icons Ic1 and Ic2 of the subject within the frame F displayed in the composition setting region 15C. The user adjusts positions and sizes of the icons Ic1 and Ic2 to obtain the desired composition by moving and/or enlarging and shrinking the icons Ic1 and Ic2 of the subject within the frame F.

Figure 10:
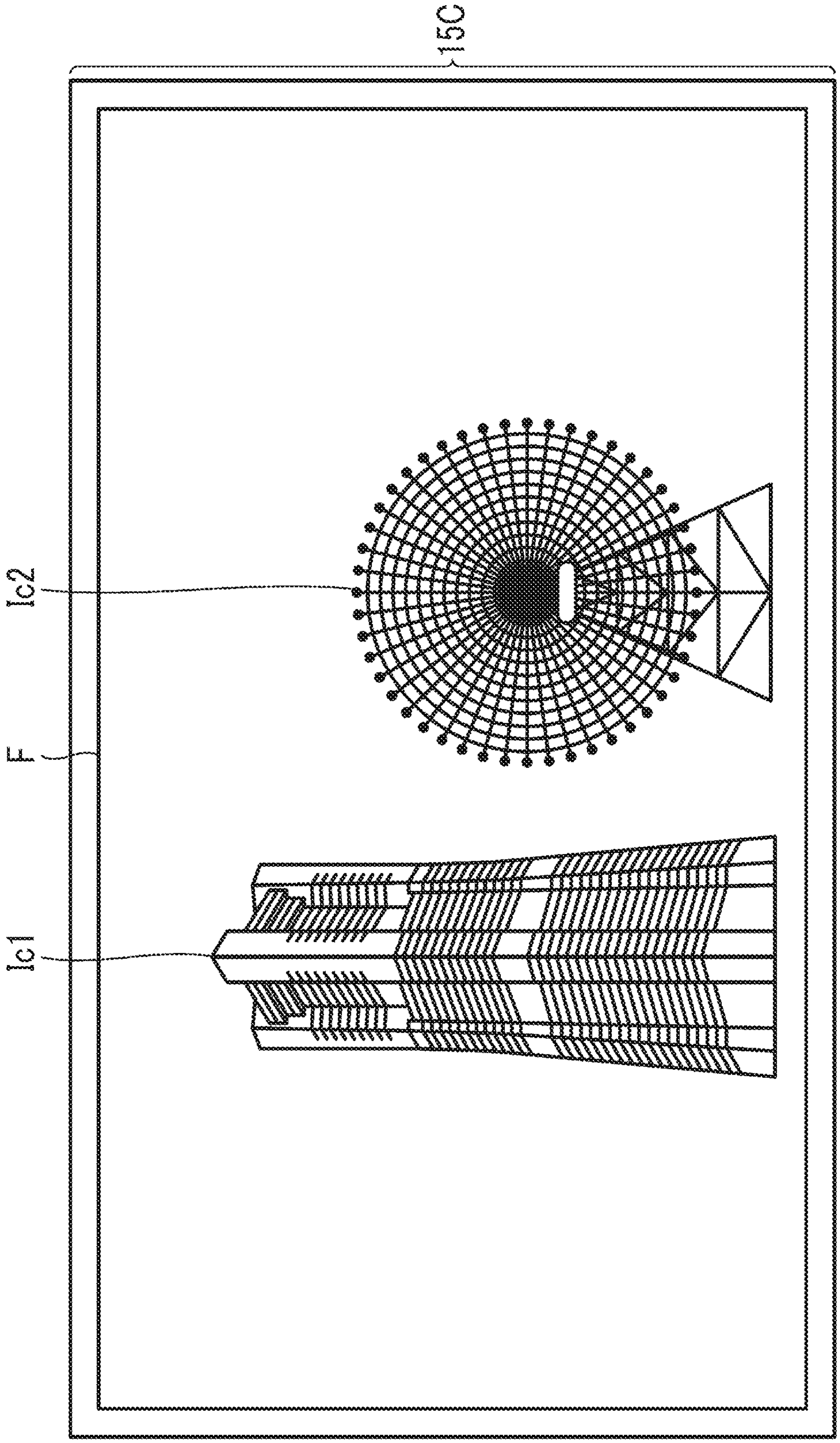
FIG. 10 is a conceptual diagram of a setting operation of composition.
Figure 11:
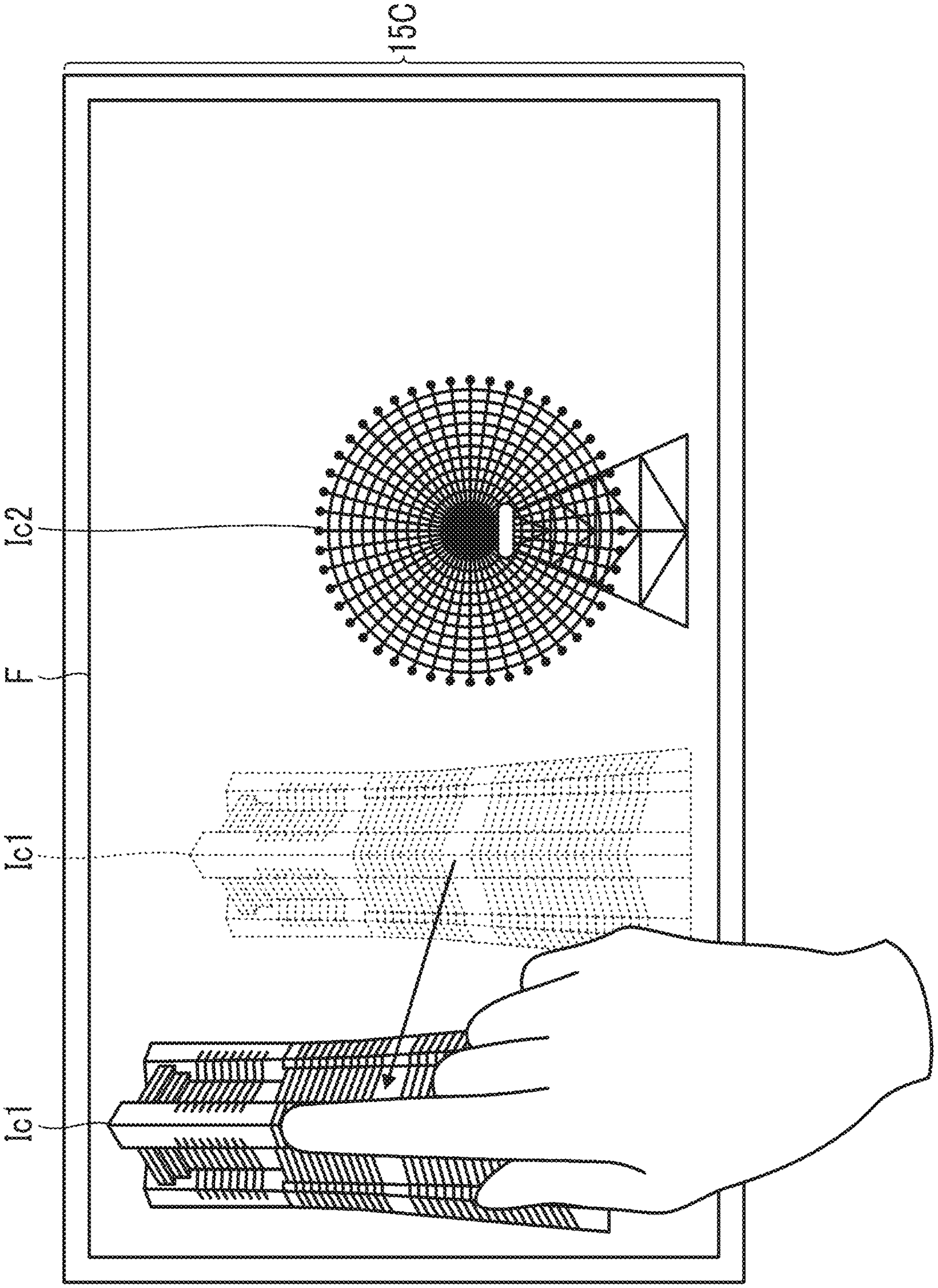
FIG. 11 is a conceptual diagram of the setting operation of the composition.
Figure 12:
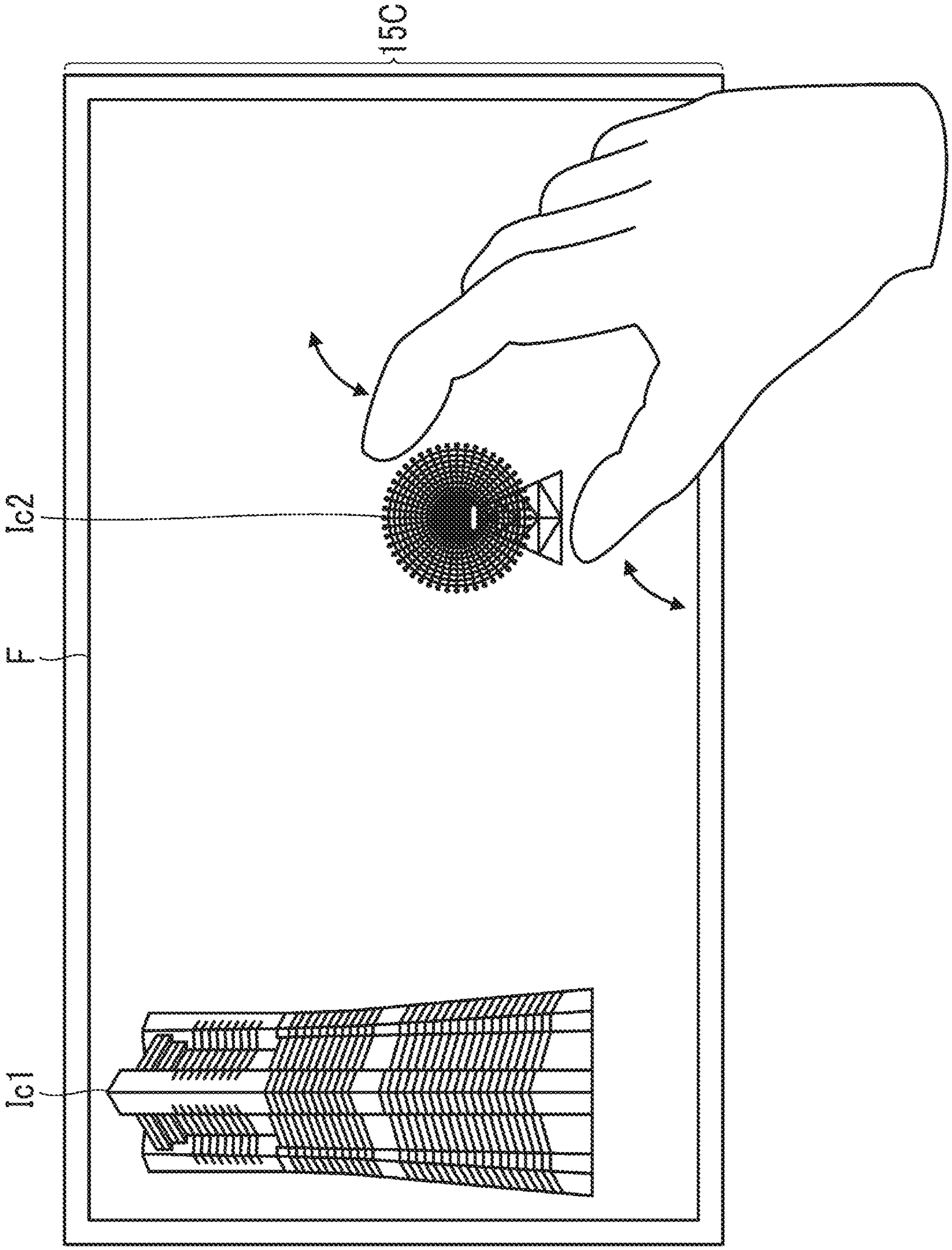
FIG. 12 is a conceptual diagram of the setting operation of the composition.
Figure 13:
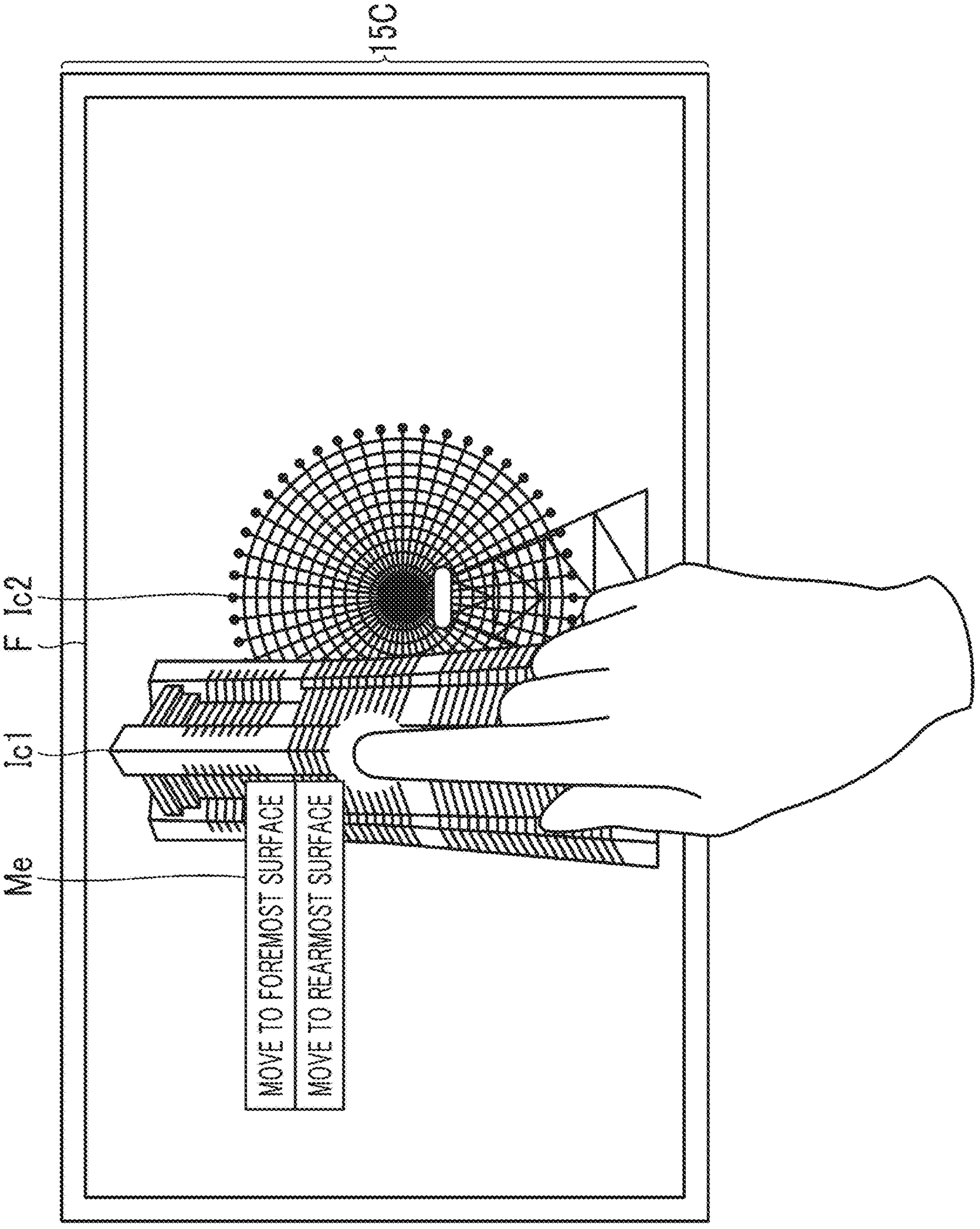
FIG. 13 is a conceptual diagram of the setting operation of the composition.
Figure 14:
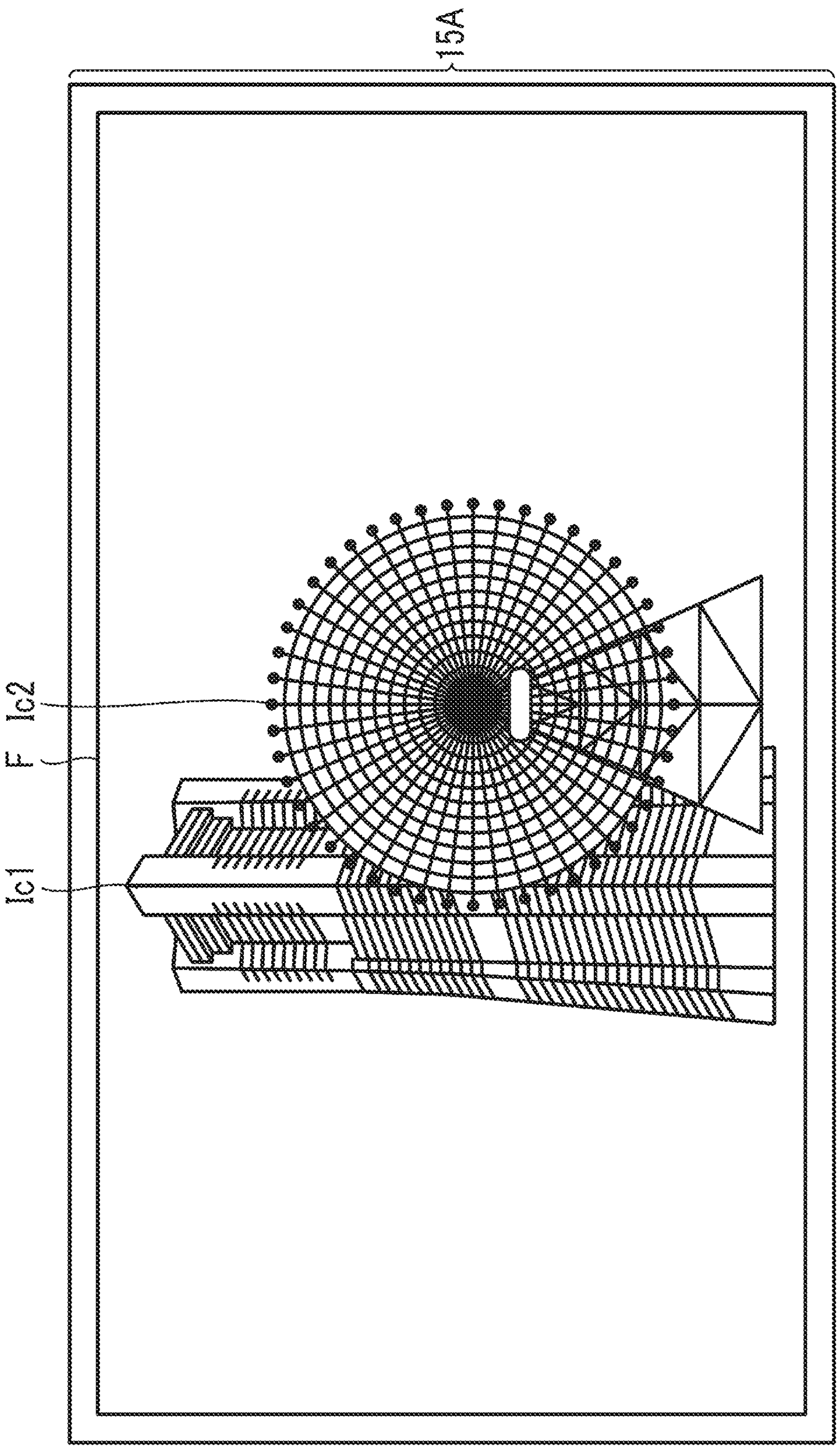
FIG. 14 is a conceptual diagram of the setting operation of the composition.

FIG. 10 illustrates an example of an initial state. FIG. 11 illustrates an example of a moving operation. FIG. 12 illustrates an example of an enlarging and shrinking operation. FIG. 13 and FIG. 14 illustrate an example of a setting operation of a front and rear relationship.

As illustrated in FIG. 10, in the initial state, the icons Ic1 and Ic2 of each subject are displayed at positions to which the icons Ic1 and Ic2 are dragged.

As illustrated in FIG. 11, the moving operation is performed by touching the icon of the subject to be moved and sliding the icon in a direction in which the icon is to be moved (so-called swipe operation). FIG. 11 illustrates an example of a case of moving the icon Ic1 of the first subject.

As illustrated in FIG. 12, the enlarging and shrinking operation is performed by pinch-in and pinch-out operations. Specifically, the icon of the subject is shrunk by performing the pinch-in operation on the icon of the subject to be shrunk. In addition, the icon of the subject is enlarged by performing the pinch-out operation on the icon of the subject to be enlarged. FIG. 12 illustrates an example of a case of shrinking the icon Ic2 of the second subject. In this case, the pinch-in operation is performed on the icon Ic2 of the second subject.

The setting operation of the front and rear relationship is performed by touching the icon of the subject as an operation target for a certain time period or longer (so-called long press). In a case where the icon of the subject as the operation target is touched for the certain time period or longer, a setting menu Me of the front and rear relationship is displayed on the screen as illustrated in FIG. 13. The setting menu Me of the front and rear relationship includes a button for moving the icon of the subject to be set as the operation target to a foremost surface and a button for moving the icon to a rearmost surface. The user sets the front and rear relationship of the icon of the subject by touching the buttons displayed in the setting menu Me of the front and rear relationship. FIG. 13 illustrates an example of a case where the icon Ic1 of the first subject is set as the operation target. In this case, the icon Ic1 of the first subject is touched for the certain time period or longer. FIG. 14 illustrates an example of a case where the icon Ic1 of the first subject is selected to be moved to the rearmost surface. In this case, the icon Ic1 of the first subject is disposed under the icon Ic2 of the second subject as illustrated in FIG. 14.

Figure 15:
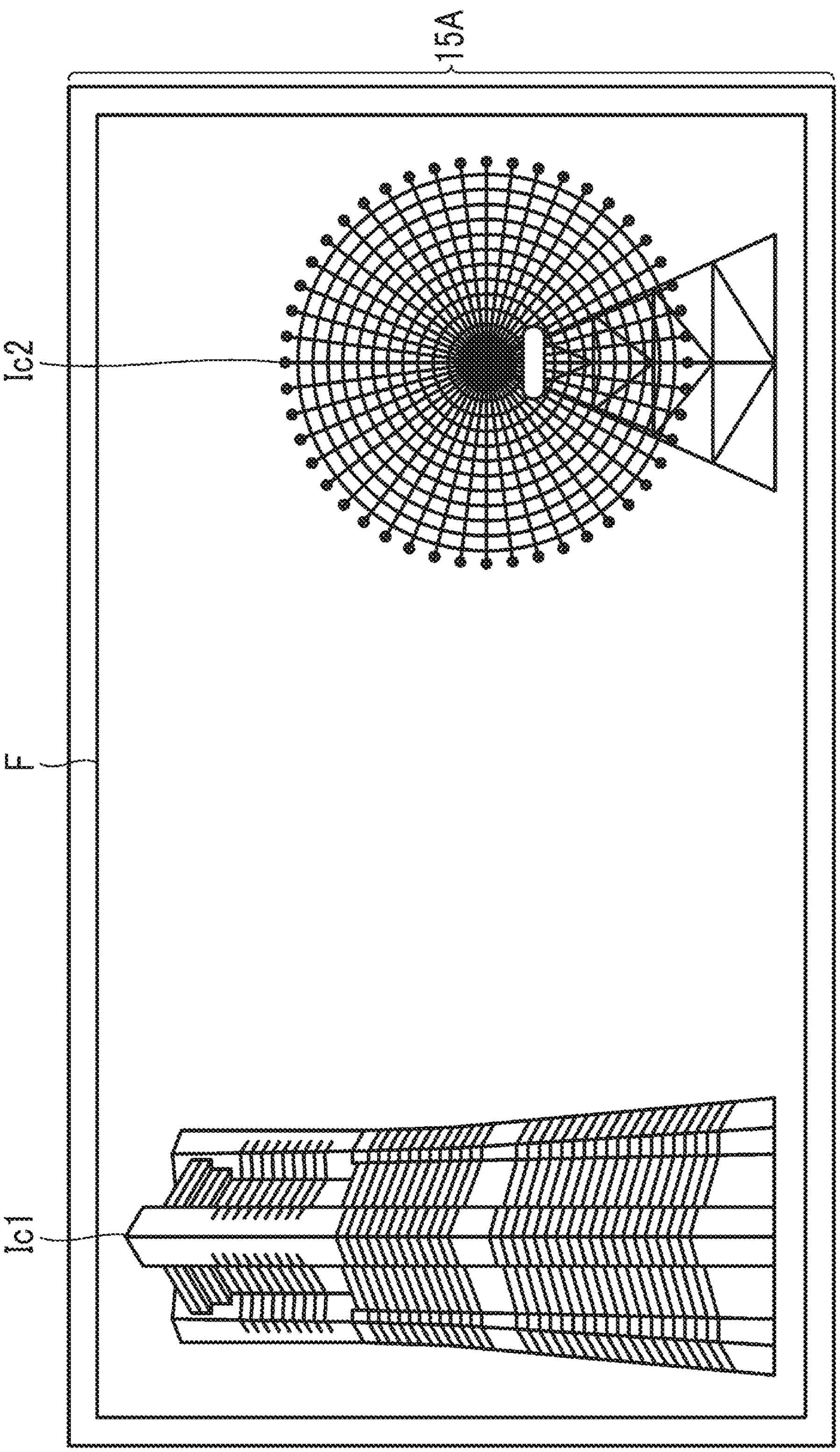
FIG. 15 is a conceptual diagram of the setting operation of the composition.

FIG. 15 illustrates an example of the composition set by the series of operations. Information about the set composition is provided to the imaging position estimation unit 10E.

The imaging position estimation unit 10E performs processing of estimating the position (imaging position) at which the first subject and the second subject can be imaged with the set composition based on the subject information and on the camera information. The imaging position here includes a position at which imaging can be performed with almost the same composition as the set composition. That is, the position at which imaging can be performed with approximately the same composition is estimated. In addition, as described above, the composition is set on the display using the icons Ic1 and Ic2 of the subject. Accordingly, the imaging position is estimated based on display states of the icons Ic1 and Ic2 on the display 15. More specifically, the imaging position is estimated based on the display states of the icons Ic1 and Ic2 within the frame F displayed on the display 15.

As described above, the subject information includes the information about the position, the information about the size, and the like of the subject to be set as the imaging target. In addition, the camera information includes the information about the size of the image sensor, the information about the settable focal length of the lens, and the like. The imaging position estimation unit 10E estimates the imaging position using these pieces of information.

Figure 16:
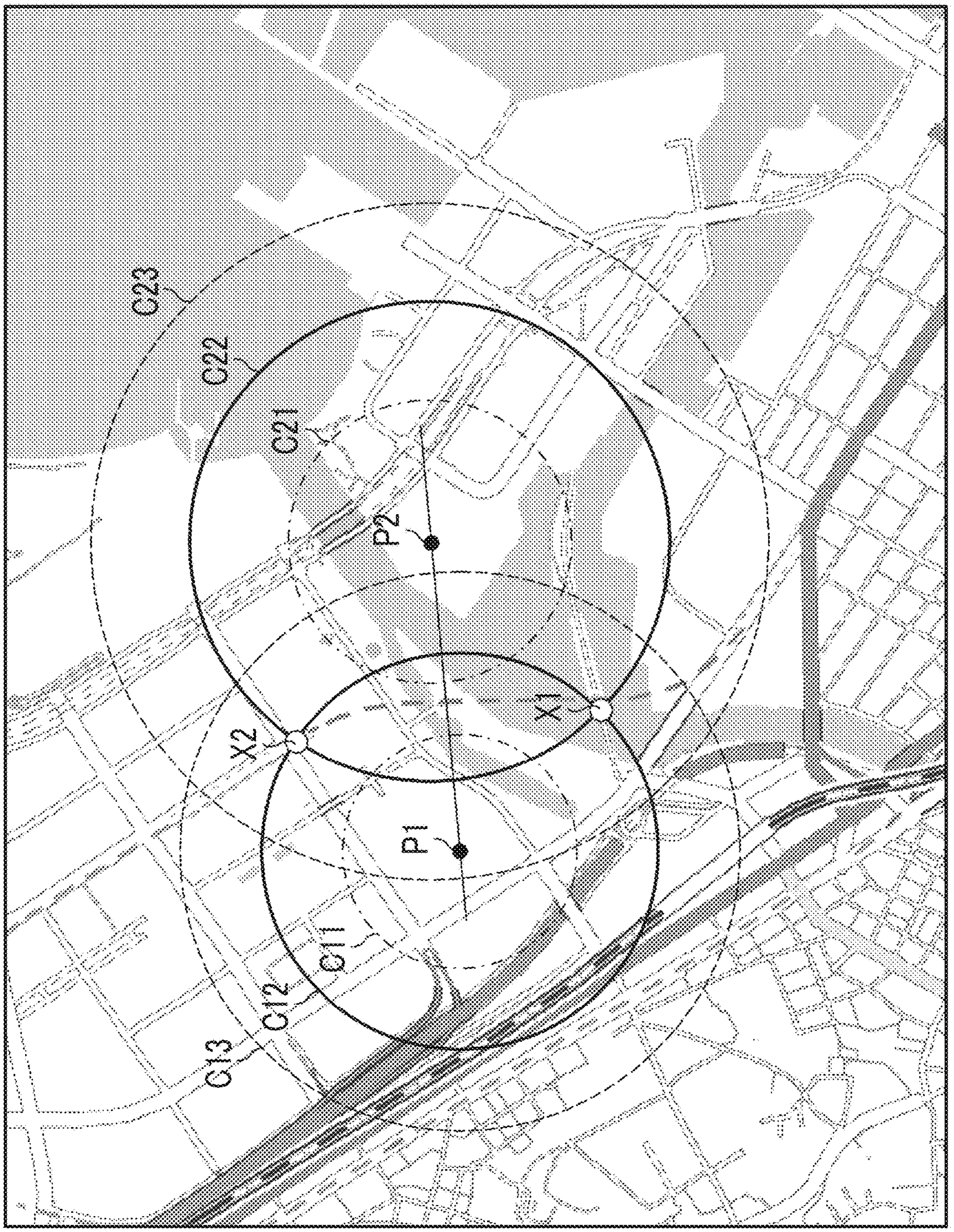
FIG. 16 is a conceptual diagram of estimation processing of an imaging position.

FIG. 16 is a conceptual diagram of estimation processing of the imaging position.

In FIG. 16, a point P1 is the position of the first subject selected as the imaging target, and a point P2 is the position of the second subject selected as the imaging target.

Here, a case where a subject having a known size is imaged is considered. In this case, a distance to the subject can be obtained from the information (the size of the image sensor, the focal length of the lens, and the like) of the camera during imaging in a case where the size of the subject within the captured image is known.

In the imaging position estimation system 1 of the present embodiment, the size and the position of the subject to be set as the imaging target are known, and the size of the image sensor and the settable focal length of the lens are also known. Accordingly, in a case where the size of the subject in the set composition is known, a distance for imaging the subject with the size can be obtained. Here, the size of the subject in the set composition is the size of the subject on the image sensor.

In FIG. 16, a circle C11 of a dot-dashed line centered at the point P1 indicates a position at which the first subject can be imaged with the set size in a case where the focal length of the lens is set to a first focal length f1 [mm]. In addition, a circle C12 of a solid line centered at the point P1 indicates a position at which the first subject can be imaged with the set size in a case where the focal length of the lens is set to a second focal length f2 [mm] (f2>f1). In addition, a circle C13 of a dashed line centered at the point P1 indicates a position at which the first subject can be imaged with the set size in a case where the focal length of the lens is set to a third focal length f3 [mm] (f3>f2).

In addition, in FIG. 16, a circle C21 of a dot-dashed line centered at the point P2 indicates a position at which the second subject can be imaged with the set size in a case where the focal length of the lens is set to the first focal length f1 [mm]. In addition, a circle C22 of a solid line centered at the point P2 indicates a position at which the second subject can be imaged with the set size in a case where the focal length of the lens is set to the second focal length f2 [mm]. In addition, a circle C23 of a dashed line centered at the point P2 indicates a position at which the second subject can be imaged with the set size in a case where the focal length of the lens is set to the third focal length f3 [mm].

Accordingly, in FIG. 16, an intersection between the circles of the same type is a position at which the first subject and the second subject can be imaged with the set size.

Here, the intersection between the circles of the same type occurs at two locations. In a case where the first subject and the second subject are imaged from the position of each intersection, a left and right positional relationship between the first subject and the second subject is reversed in the captured image. Accordingly, the intersection at which the left and right positional relationship is the same as that in the set composition is the intersection to be selected. That is, the intersection is a position at which the first subject and the second subject can be imaged with the same left and right positional relationship as the set composition. For example, in the example in FIG. 16, the circle C12 and the circle C22 of the solid line have two intersections X1 and X2. In the set composition, the first subject is disposed on a left side of the image, and the second subject is disposed on a right side of the image as illustrated in FIG. 15. In a case where the first subject and the second subject are imaged from the position of the intersection X1, an image in which the first subject is disposed on the left side of the image and the second subject is disposed on the right side of the image is captured. On the other hand, in a case where the first subject and the second subject are imaged from the position of the intersection X2, an image in which the first subject is disposed on the right side of the image and the second subject is disposed on the left side of the image is captured. Accordingly, in this case, the intersection X1 is the intersection at which imaging can be performed with a correct left and right positional relationship.

In the example illustrated in FIG. 16, the circle C11 and the circle C21 of the dot-dashed line do not have an intersection. This means that the first subject and the second subject cannot be imaged with the set composition at the first focal length f1 [mm]. On the other hand, the circle C12 and the circle C22 of the solid line and the circle C13 and the circle C23 of the dashed line have intersections. Thus, in a case where the focal length is set to the second focal length f2 [mm] or to the third focal length f3 [mm], the first subject and the second subject can be imaged with the set size.

However, an interval between the first subject and the second subject to be imaged is different between a case where imaging is performed by setting the focal length to the second focal length f2 [mm] and a case where imaging is performed by setting the focal length to the third focal length f3 [mm]. Accordingly, the position at which the first subject and the second subject can be imaged with the set composition can be obtained by further obtaining the focal length with which the first subject and the second subject can be imaged with the set interval.

The imaging position estimation unit 10E searches for the position at which the first subject and the second subject can be imaged with the set composition by changing the focal length in a stepwise manner.

Figure 17:
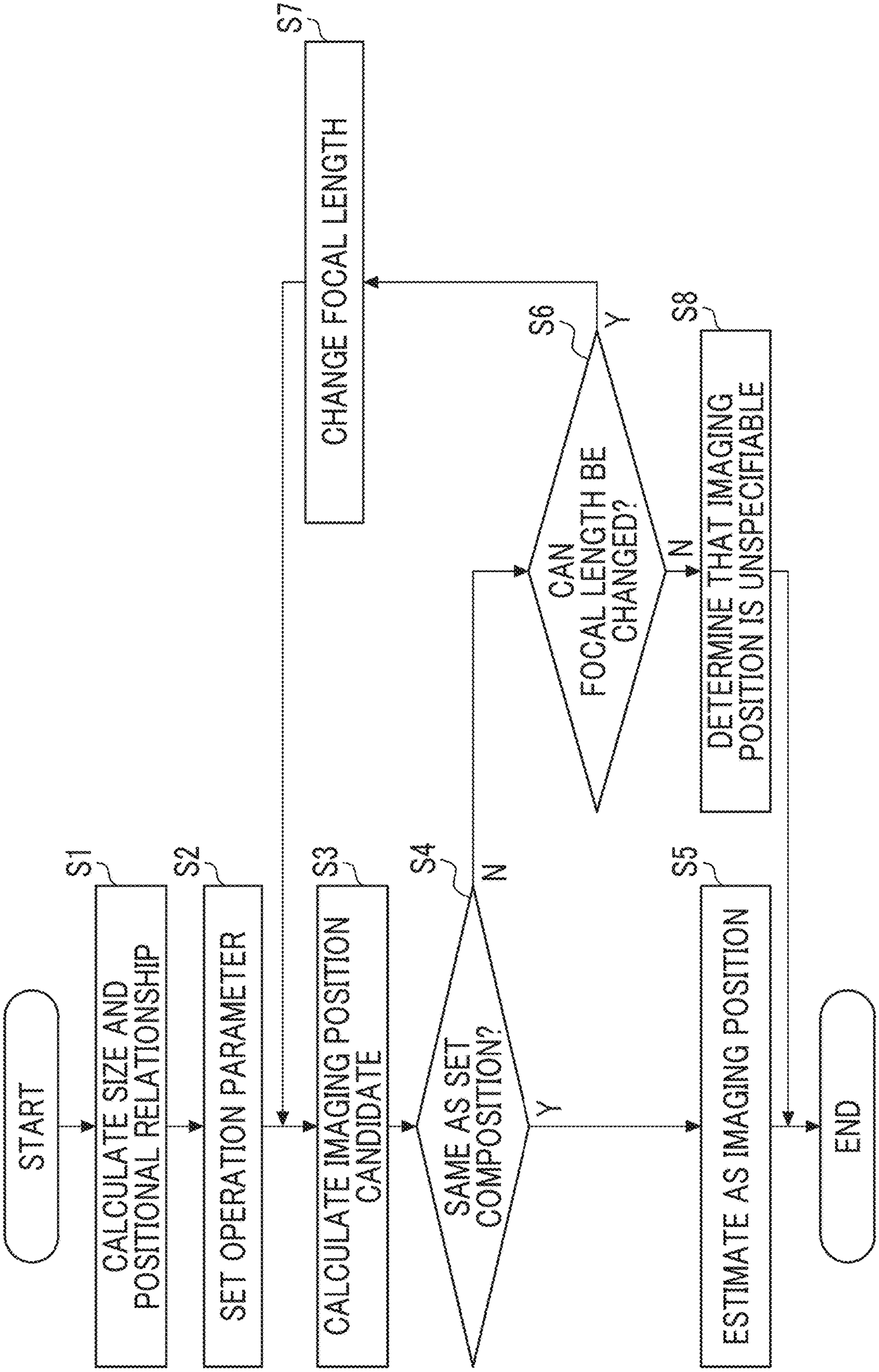
FIG. 17 is a flowchart illustrating a procedure of the estimation processing of the imaging position.

FIG. 17 is a flowchart illustrating a procedure of the estimation processing of the imaging position.

First, the sizes and the positional relationship of the first subject and the second subject in the set composition are calculated (step S1). Specifically, the sizes and the positional relationship of the first subject and the second subject on the image sensor are calculated.

Next, an operation parameter for calculating the imaging position is set (step S2). The focal length is set to a value at a wide end as an initial value.

Next, a candidate of the imaging position is calculated based on the set operation parameter (step S3). As described above, the candidate of the imaging position is calculated as the position at which the first subject and the second subject can be imaged with the size in the set composition. This position is calculated at two locations as an intersection of circles. Out of the two intersections, the intersection at which the first subject and the second subject can be imaged with the same left and right positional relationship as the set composition is selected as the candidate of the imaging position.

Next, whether or not the same image as the composition can be captured in a case where the first subject and the second subject are imaged at the selected imaging position is determined (step S4). That is, whether or not the first subject and the second subject can be imaged with the same left and right positional relationship (interval) as the set composition is determined.

In a case where it is determined that the same image as the set composition can be captured, the selected position is estimated as the imaging position (step S5), and the processing is finished.

On the other hand, in a case where it is determined that the same image as the set composition cannot be captured, whether or not the focal length can be changed is determined (step S6). In a case where the focal length can be changed, the focal length is changed (step S7). The focal length is changed to a telephoto side by an amount of change set in advance. Then, the candidate of the imaging position is calculated again based on the focal length after change (step S3).

In a case where the focal length cannot be changed, it is determined that the imaging position is inestimable (step S9), and the processing is finished. In the present embodiment, a case where the focal length cannot be changed is a case where the focal length has reached a telephoto end.

The imaging position estimation unit 10E searches for the imaging position by switching the focal length in a stepwise manner. In a case where the focal length cannot be changed, it is determined that the imaging position is inestimable. Thus, the processing performed by the imaging position estimation unit 10E includes processing of determining availability of imaging with the set composition.

The imaging position estimation unit 10E performs the estimation processing of the imaging position in accordance with an instruction to start processing from the user. The user provides the instruction to start processing by touching the Check & Search button Bt1 (refer to FIG. 9) displayed in the information display region 15B.

A processing result of the imaging position estimation unit 10E is provided to the result output unit 10F. Information about the processing result includes information about the focal length in addition to information about the estimated imaging position. In a case where it is determined that the imaging position is inestimable, information indicating that imaging is unavailable is provided to the result output unit 10F as the processing result.

The result output unit 10F performs processing of outputting the processing result of the imaging position estimation unit 10E. This processing is performed by displaying the processing result on the display 15 in a predetermined form.

Figure 18:
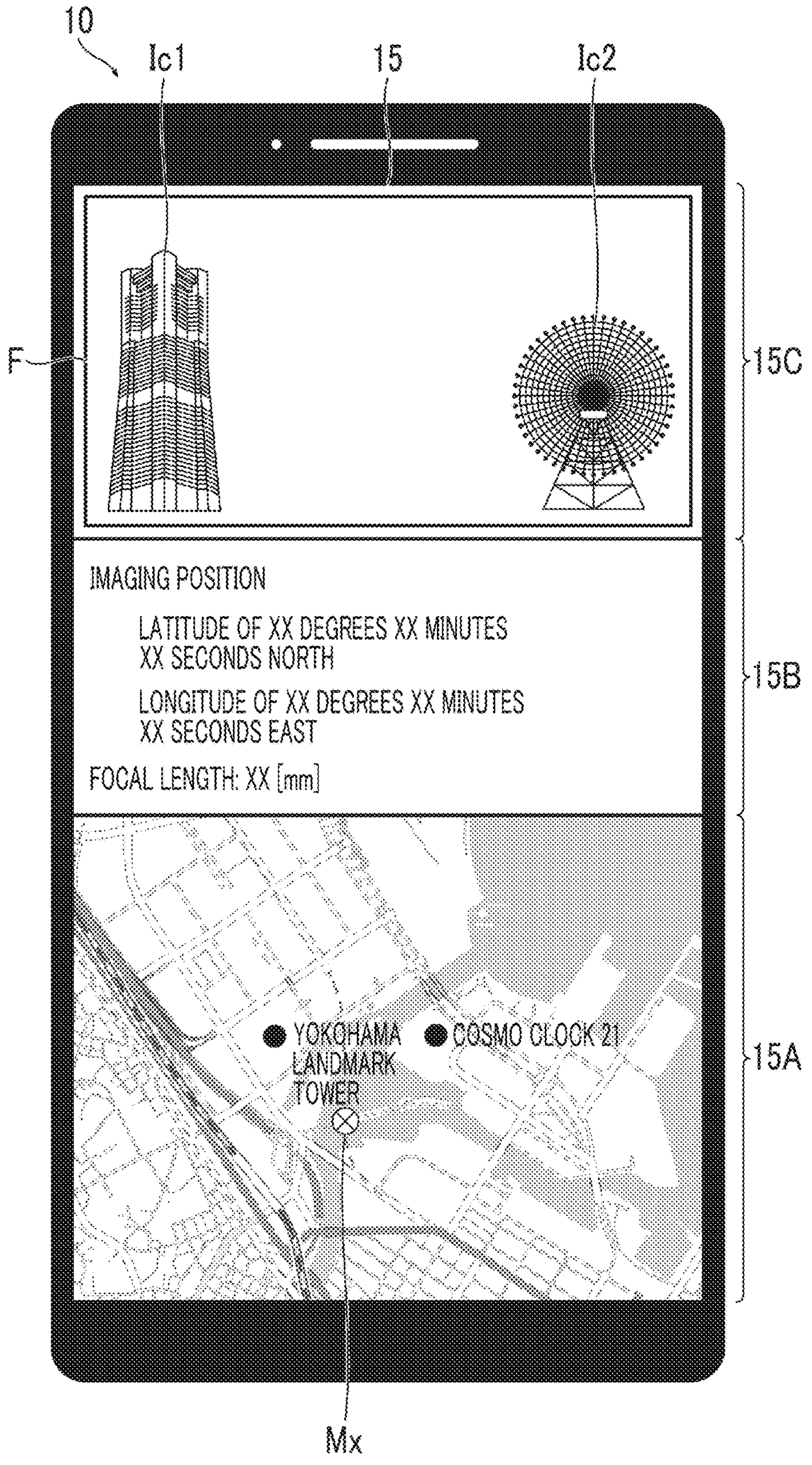
FIG. 18 is a diagram illustrating an example of display of a result of the estimation processing of the imaging position.
Figure 19:
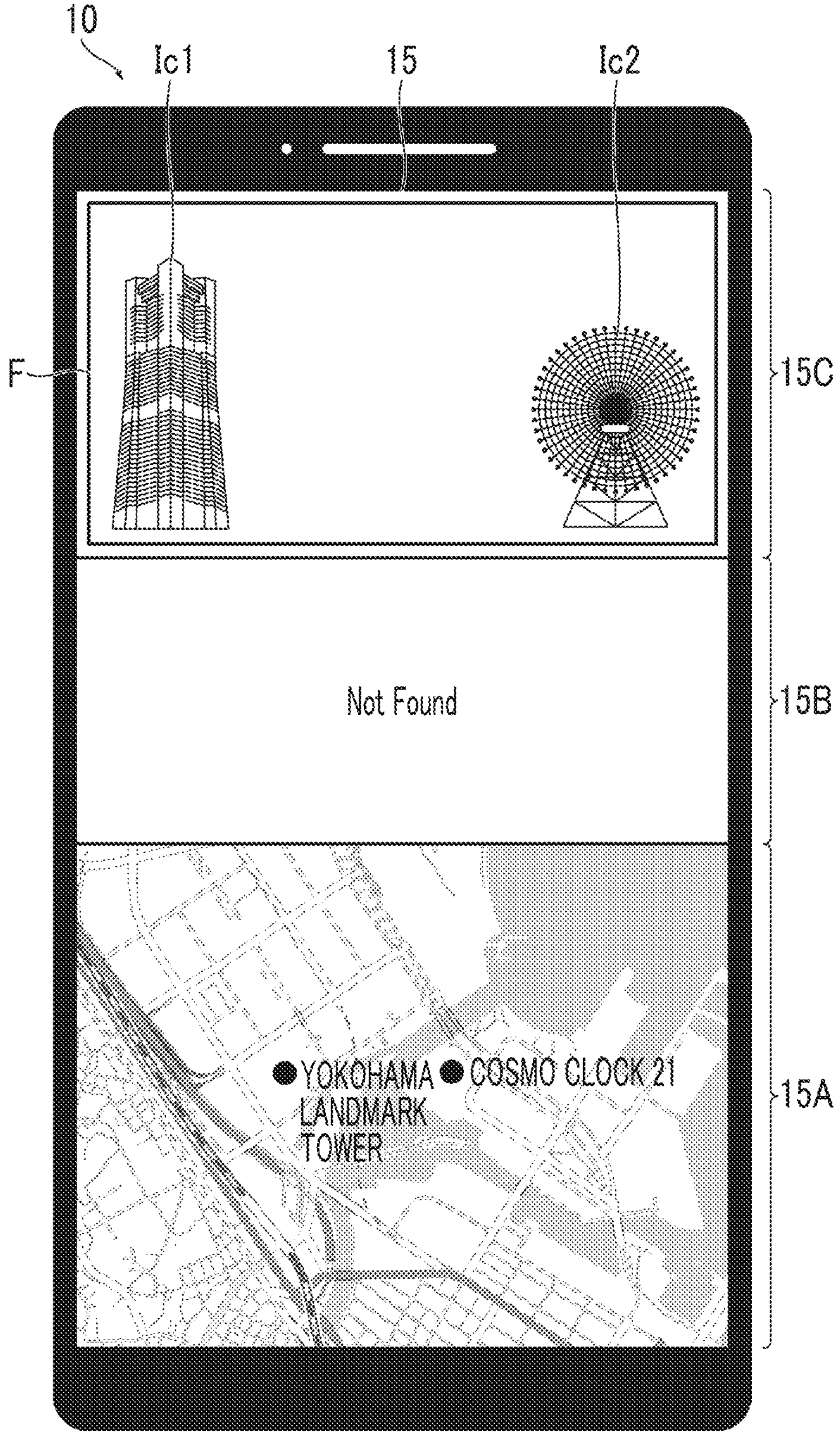
FIG. 19 is a diagram illustrating an example of display of the result of the estimation processing of the imaging position.

FIG. 18 and FIG. 19 are diagrams illustrating an example of display of the result of the estimation processing of the imaging position. FIG. 18 illustrates an example of display in a case where the imaging position is estimated. On the other hand, FIG. 19 illustrates an example of a case where the imaging position is not estimated.

As illustrated in FIG. 18, in a case where the imaging position is estimated, information about the estimated imaging position is displayed on the display 15. In the present embodiment, a mark Mx indicating the imaging position is displayed on the map displayed in the map display region 15A. In addition, information about a latitude and a longitude of the estimated imaging position is displayed in the information display region 15B. Furthermore, information about the focal length in imaging is displayed in the information display region 15B. By viewing this display, the user can perceive an imaging condition (focal length) and the position at which the composition set by the user can be captured.

On the other hand, in a case where the imaging position is not estimated, that is, in a case where the set composition is uncapturable, a predetermined error message is displayed in the information display region 15B as illustrated in FIG. 19. In the present embodiment, a text of "Not Found" is displayed in the information display region 15B as the error message.

In a case where the error message is displayed, the user sets the composition again. In a case where the user touches the composition setting region 15C in order to set the composition again, the error message disappears. In a case where the error message disappears, the Check & Search button Bt1 is displayed again in the information display region 15B as illustrated in FIG. 9. Accordingly, the instruction to start the estimation processing of the imaging position can be provided again with respect to the composition set again.

Information Provision Server

The information provision server 100 provides various types of information to the user terminal. The information provision server 100 is composed of a general server computer.

Figure 20:
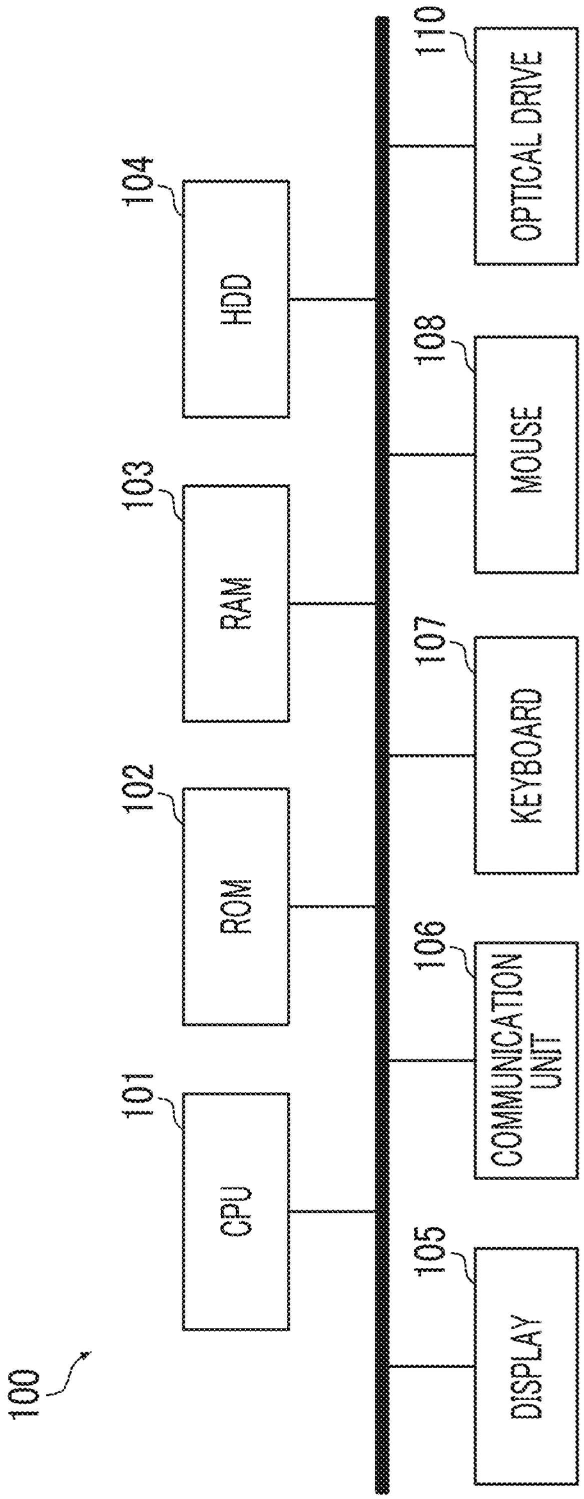
FIG. 20 is a block diagram illustrating an example of a hardware configuration of an information provision server.

FIG. 20 is a block diagram illustrating an example of a hardware configuration of the information provision server.

As illustrated in FIG. 20, the information provision server 100 comprises a CPU 101 that controls an overall operation, a ROM 102 that stores a program such as an initial program loader (IPL) used for driving the CPU 101, a RAM 103 used as a work area and the like of the CPU 101, a hard disk drive (HDD) 104 that stores various programs and various types of data and the like for the information provision server 100, a display 105, a communication unit 106 for performing data communication using the network 2, a keyboard 107, a mouse 108, an optical drive 110, and the like.

Figure 21:
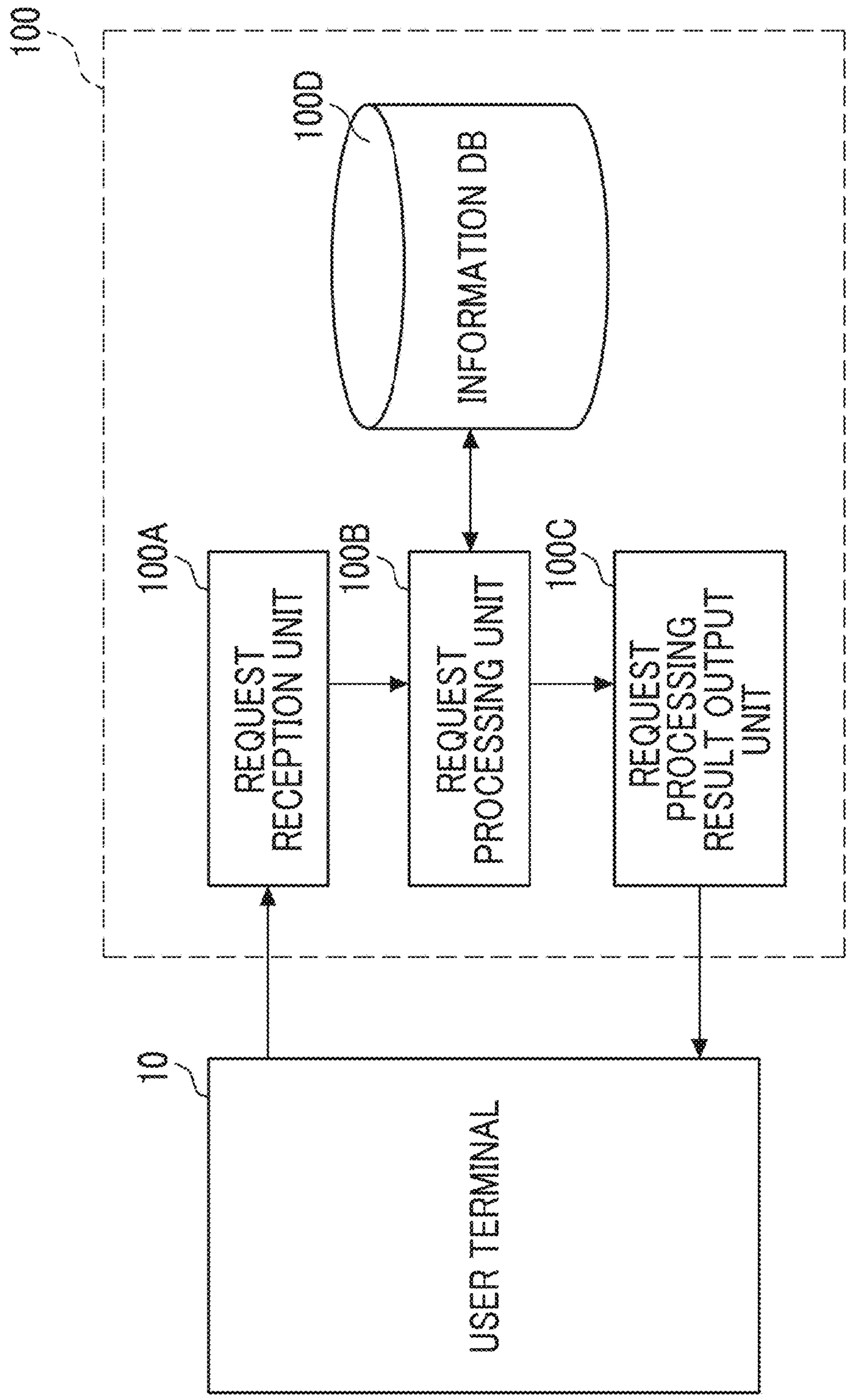
FIG. 21 is a block diagram of main functions provided by the information provision server.

FIG. 21 is a block diagram of main functions provided by the information provision server.

As illustrated in FIG. 21, the information provision server 100 has functions of a request reception unit 100A, a request processing unit 100B, a request processing result output unit 100C, and the like. Functions of each unit are implemented by executing a predetermined program via the CPU 101.

The request reception unit 100A performs processing of receiving a request to provide information from the user terminal 10. That is, a request to provide the map data, provide the subject information, and the like is received.

The request processing unit 100B processes the request received by the request reception unit 100A. For example, processing of acquiring the corresponding map data in response to the request to provide the map data is performed. In addition, processing of acquiring the corresponding subject information in response to the request to provide the subject information is performed.

The map data, the subject information, and the like are stored in an information database (DB) 100D. Accordingly, the request processing unit 100B acquires the map data, the subject information, and the like from the information database 100D. The information database 100D is stored in, for example, the HDD 104.

The request processing result output unit 100C performs processing of acquiring a processing result of the request received by the request reception unit 100A from the request processing unit 100B and outputting (transmitting) the processing result to the user terminal 10.

Operation

Figure 22:
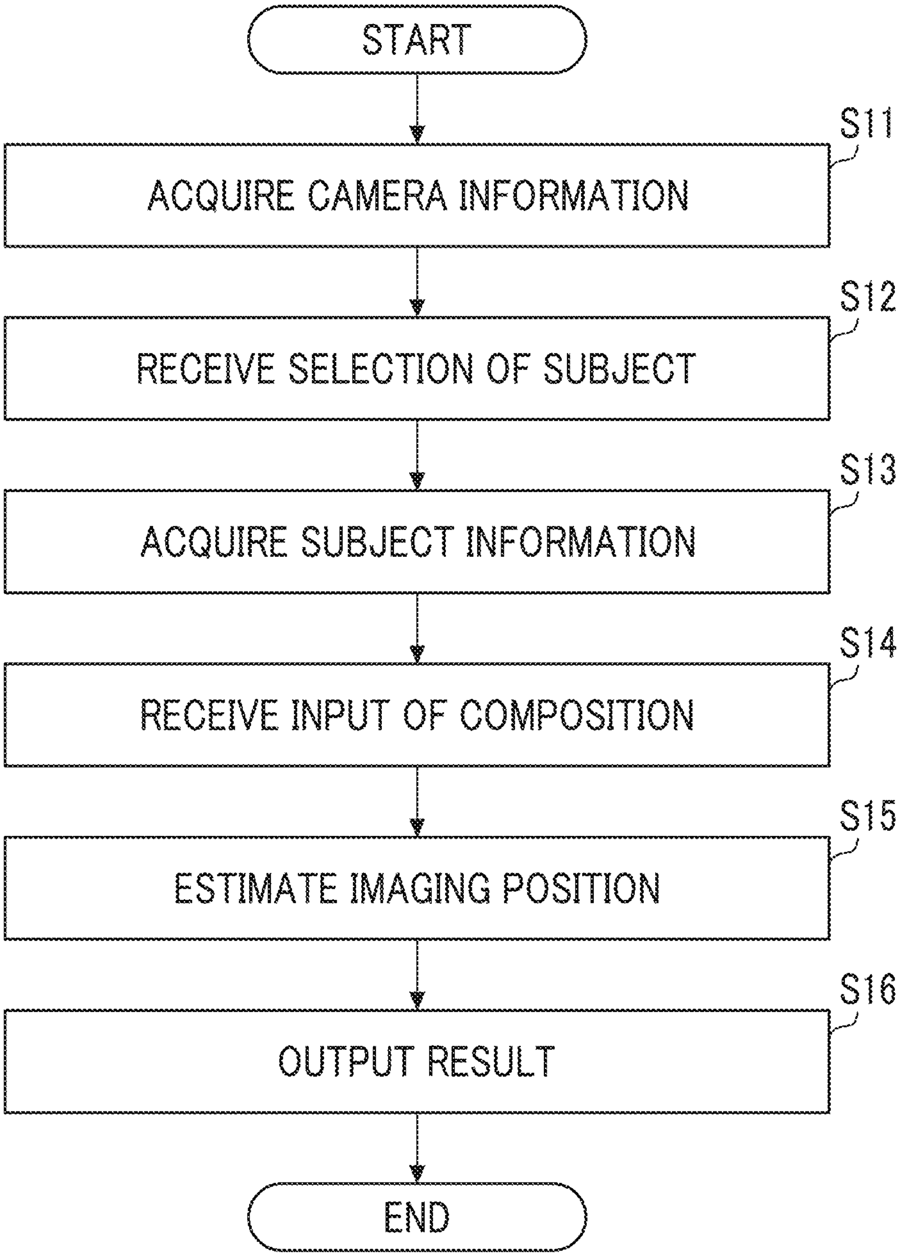
FIG. 22 is a flowchart illustrating a processing operation of the user terminal.

FIG. 22 is a flowchart illustrating a processing operation of the user terminal. FIG. 22 illustrates a flow of the series of processing from selection of the subject to output of an estimation result of the imaging position.

First, the processing of acquiring the camera information is performed (step S11). As described above, in the present embodiment, the camera information is stored in the ROM 12 and/or the EEPROM 14. Thus, the camera information is acquired from the ROM 13 and/or the EEPROM 14.

Next, the processing of receiving selection the subject to be set as the imaging target is performed (step S12). As illustrated in FIG. 4, the subject is selected using the map. The user selects the subject to be set as the imaging target on the map displayed on the display 15. More specifically, the subject to be set as the imaging target is selected from the subject candidates Ob displayed on the map. Selection is performed by touching the subject candidate Ob to be set as the imaging target for the predetermined time period or longer. In a case where selection is confirmed, the icon of the selected subject is displayed in the information display region 15B within the screen of the display 15 as illustrated in FIG. 6 and FIG. 7. In the present embodiment, two subjects are selected.

Next, the processing of acquiring the subject information of the selected subject is performed (step S13). The subject information is acquired from the information provision server 100.

Next, the processing of receiving input of the composition is performed (step S14). The composition is input using the icon of the subject. As illustrated in FIG. 8, the user displays the icon to be used for setting the composition in the composition setting region 15C by dragging the icons Ic1 and Ic2 displayed in the information display region 15B to the composition setting region 15C. As illustrated in FIG. 11 to FIG. 14, the user sets the composition by moving and/or enlarging and shrinking the icons Ic1 and Ic2 displayed in the composition setting region 15C.

After setting of the composition is completed, the estimation processing of the imaging position is performed in accordance with the instruction to start processing from the user (step S15). The instruction to start processing is provided by touching the Check & Search button Bt1 (refer to FIG. 9) displayed in the information display region 15B.

After the estimation processing is completed, the processing of outputting the result is performed (step S16). The result is displayed on the display 15. At this point, display content changes between a case where the imaging position is estimated and a case where the imaging position is not estimated. As illustrated in FIG. 18, in a case where the imaging position is estimated, the information about the estimated imaging position is displayed on the display 15. Specifically, the mark Mx indicating the imaging position is displayed on the map displayed in the map display region 15A. In addition, the information about the latitude and the longitude of the estimated imaging position and the information about the focal length in imaging are displayed in the information display region 15B. By viewing this display, the user can perceive the imaging condition (focal length) and the position at which the composition set by the user can be captured. On the other hand, in a case where the imaging position is not estimated, the predetermined error message is displayed in the information display region 15B as illustrated in FIG. 19. The user sets the composition again in accordance with this display.

As described above, according to the imaging position estimation system of the present embodiment, the position (imaging position) at which imaging can be performed can be obtained by simply selecting the subject to be imaged and inputting the composition. Accordingly, the image of the desired composition can be simply captured.

Modification Example (1) Designation of Subject

While it is configured to designate (select) the imaging target using the map in the embodiment, a method of designating the imaging target is not limited thereto. For example, it can be configured to designate the imaging target by inputting a name. In this case, the subject information is stored in the information database 100D of the information provision server 100 in association with the name of the subject.

(2) Icon

The icon used in setting the composition may have a shape with which a target can be approximately recognized. That is, the icon of a form with which approximate composition can be set may be used. Accordingly, for example, the icon represented by a silhouette can also be used.

(3) Setting of Composition

While it is configured to set the composition using a region (composition setting region) of a part of the screen of the display in the embodiment, it may be configured to set the composition using, for example, the entire screen. In this case, display may be switched to the entire screen in accordance with an instruction from the user.

(4) Estimation Processing of Imaging Position

Figure 23:
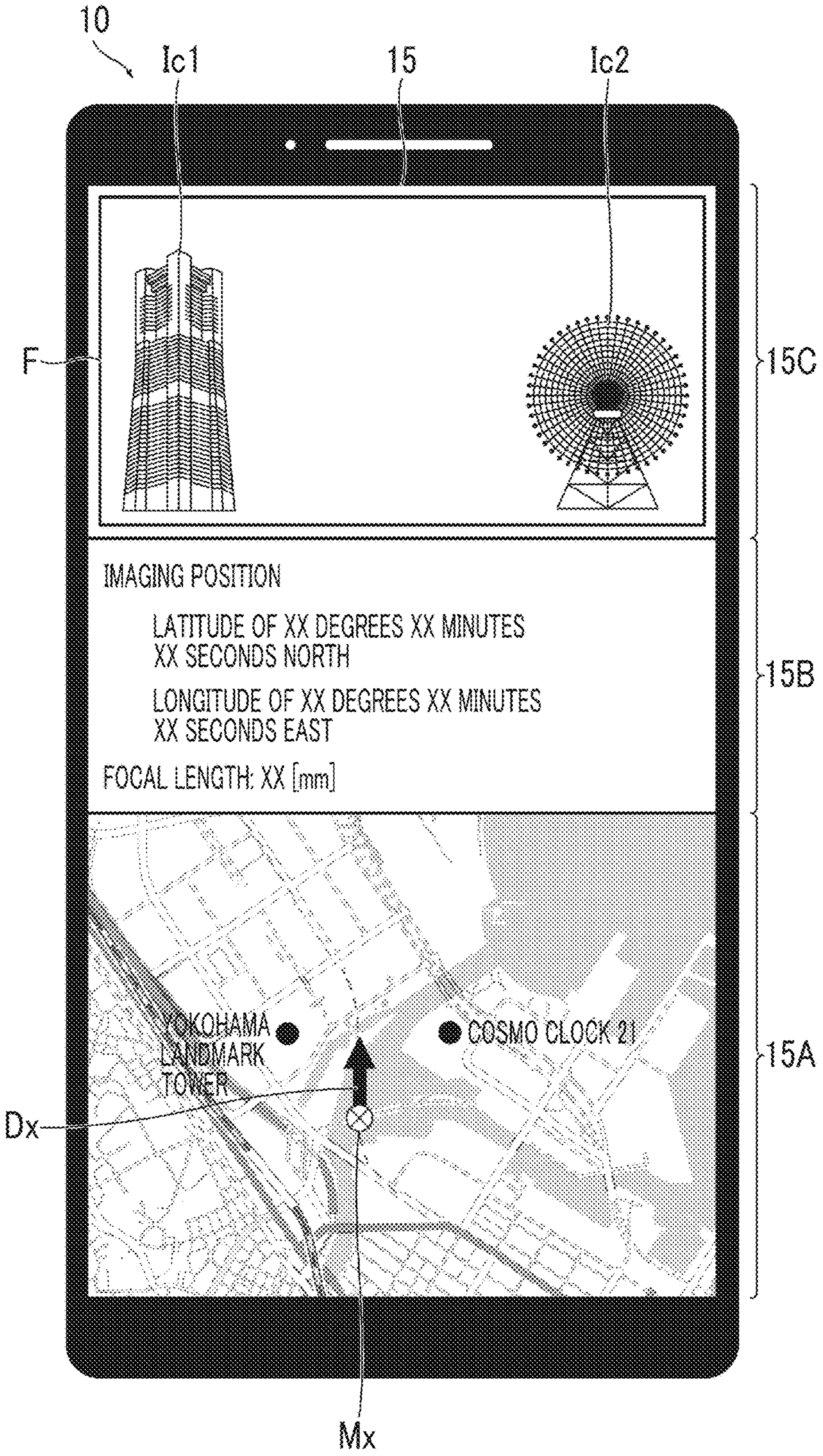
FIG. 23 is a diagram illustrating an example of display of the result of the estimation processing including an imaging direction.

While it is configured to estimate only the imaging position in the embodiment, it can be configured to also estimate an imaging direction in addition to the imaging position. FIG. 23 is a diagram illustrating an example of display of the result of the estimation processing including the imaging direction. As illustrated in FIG. 23, in the case of performing estimation including the imaging direction, an estimation result of the imaging direction is displayed on the display 15 together with the imaging position. In the example illustrated in FIG. 23, the imaging direction is indicated by an arrow Dx extending from the mark Mx indicating the imaging position.

In addition, it can be configured to estimate the imaging position further including the altitude. Accordingly, imaging on which a vertical position is reflected can be performed. In the case of estimating the imaging position including the altitude, a spherical surface is set instead of a circle, and the position at which each subject can be imaged is estimated. That is, in a case where the lens is set to have a predetermined focal length fx [mm], the position at which each subject can be imaged with the size in the set composition is represented by the spherical surface, and the imaging position is estimated by obtaining an intersection of the spherical surface.

In addition, in setting the composition, it can be configured to set the composition including a direction of the subject and estimate the position at which the subject can be imaged in the set direction. For example, for the subject having a front surface, it can be configured to estimate the position at which imaging can be performed by setting a direction of the front surface. In setting the direction of the subject, it is configured to adjust the direction using, for example, an icon having a three-dimensional shape.

Furthermore, whether or not the estimated imaging position is an enterable location may be determined. In this case, for example, information about an unenterable location is held in the information database 100D, and whether or not the estimated imaging position corresponds to the unenterable location is determined. In a case where the estimated imaging position is the unenterable location, a predetermined alert is issued. For example, an alert message is displayed on the display 15. The unenterable location includes a sea, a river, a lake, and the like in addition to private lands. In addition, a dangerous area and a region that is difficult to enter are included. For the area that is difficult to enter such as a mountain, for example, information about a history of passage of a person can be collected, and an area not having the history of passage can be set as the area that is difficult to enter. Alternatively, it can be configured to determine whether or not a location is enterable by referring to a heat map of the history of passage that is separately generated.

In addition, in the case of estimating the imaging position including the altitude, whether or not the estimated imaging position is a reachable position may be further determined. For example, in a case where the altitude from a ground surface exceeds 2 m, it can be determined that the position is unreachable.

In a case where the estimated imaging position is the unreachable position, a predetermined alert is issued. For example, an alert message is displayed on the display 15.

(5) Provision of Information About Backlight

A function of calculating a time slot in which backlight occurs in the case of imaging the first subject and the second subject from the location estimated as the imaging position and presenting information about the calculated time slot to the user may be further comprised. For example, the information about the time slot in which backlight occurs is displayed in the information display region 15B together with the information about the imaging position.

It may be configured to present information about a time slot in which backlight does not occur instead of the information about the time slot in which backlight occurs. In this case, a time slot excluding the time slot in which backlight occurs is presented.

Furthermore, a function of calculating a time slot in which insufficiency of a light quantity occurs and presenting information about the calculated time slot to the user may be comprised. For example, a time slot in which brightness is less than or equal to a threshold value is calculated as the time slot in which insufficiency of the light quantity occurs.

It may be configured to present both of the information about the time slot in which backlight occurs and the information about the time slot in which insufficiency of the light quantity. In addition, it may be configured to present any one of the information only.

(6) Camera

While a case of performing imaging using the camera 18 comprised in the user terminal 10 has been illustratively described in the embodiment, imaging can be performed using a camera separated from the user terminal. In this case, it is required to separately acquire the camera information of the camera to be used. A method of acquiring the camera information is not particularly limited. For example, it can be configured to manually input the camera information into the user terminal. In addition, it can be configured to automatically acquire the camera information by communicating with the camera. Furthermore, it can be configured to acquire the camera information by acquiring identification information of the camera to be used. In this case, for example, the camera information of each camera is stored in the information database 100D of the information provision server 100, and the camera information of the corresponding camera is acquired from the information provision server 100.

In addition, while a case where the lens has a zoom function has been described in the embodiment, the lens of the camera may be a so-called single focal length lens. In this case, the imaging position is estimated with a constant focal length.

Furthermore, it can be configured to perform imaging by mounting the camera in, for example, an unmanned vehicle, an unmanned aerial vehicle (so-called drone), or an unmanned surface vehicle. In this case, imaging at a location at which a person cannot enter can be performed, and a selectable range of the imaging position can be expanded. Particularly, in the case of performing imaging by mounting the camera in the unmanned aerial vehicle, altitude constraints can be lifted.

(7) Apparatus Configuration

While the user terminal implements functions of an information processing apparatus in the embodiment, the camera, for example, may comprise the functions of the information processing apparatus.

In addition, while it is configured to receive provision of various types of information from the information provision server 100 in the embodiment, the user terminal may have the functions of the information provision server 100. In this case, the information provision server is not required.

Second Embodiment

A case of setting an unmoving subject, that is, a subject (fixed object) of which the geographical position is fixed, as the imaging target has been described in the embodiment. The subject to be set as the imaging target is not limited thereto. The subject as the imaging target can include an object of which the geographical position can be specified at at least the time of imaging. For example, the subject as the imaging target can include an object such as a celestial body that moves with regularity.

Hereinafter, an example of a case where the subject candidates include a celestial body will be described. Since a basic configuration of the system is the same as that in the embodiment, only a method of selecting the subject and a method of estimating the imaging position will be described here.

Selection of Subject

In the present embodiment, the subject to be set as the imaging target is selected by selecting a target object on a map or inputting a name of the target object.

Figure 24:
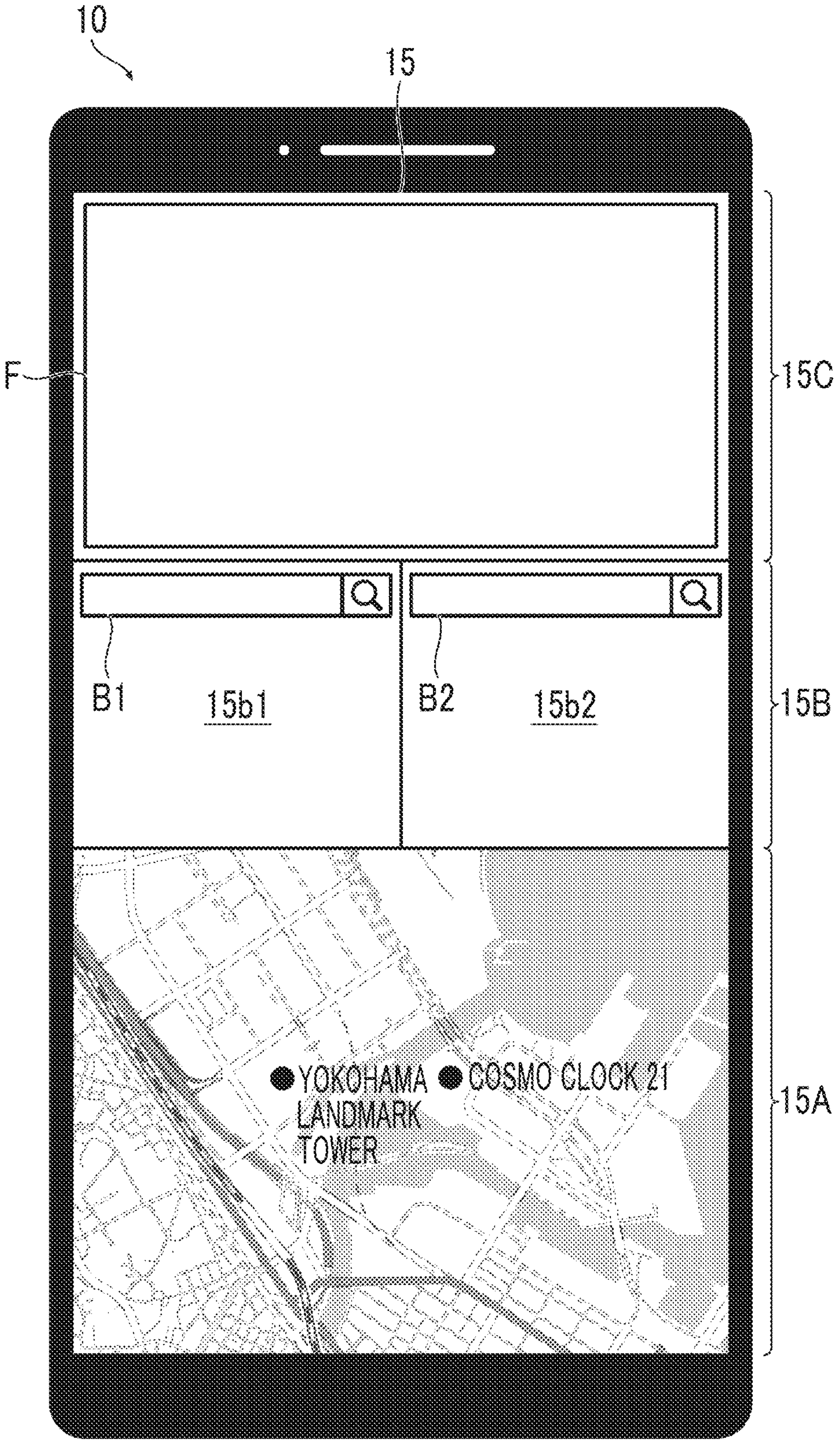
FIG. 24 is a diagram illustrating an example of a screen for performing a selection operation of the subject.

FIG. 24 is a diagram illustrating an example of a screen for performing a selection operation of the subject.

As illustrated in FIG. 24, the map for selecting the subject is displayed in the map display region 15A. This point is the same as the first embodiment.

On the other hand, in the case of selecting the subject by inputting the name of the target object, search boxes B1 and B2 displayed in the information display region 15B are used. As illustrated in FIG. 24, the first search box B1 is displayed in the first icon display region 15*b*1 set in the information display region 15B. In addition, the second search box B2 is displayed in the second icon display region 15*b*2 set in the information display region 15B. In the case of selecting the first subject by its name, the name is input in the first search box B1. In addition, in the case of selecting the second subject by its name, the name is input in the second search box B2. A text input function comprised in the user terminal 10 is used for inputting a text. After the name is input, a target is searched by touching a search button. In a case where the target is selectable as the subject, the icon of the target is displayed in the icon display region as a result.

Figure 25:
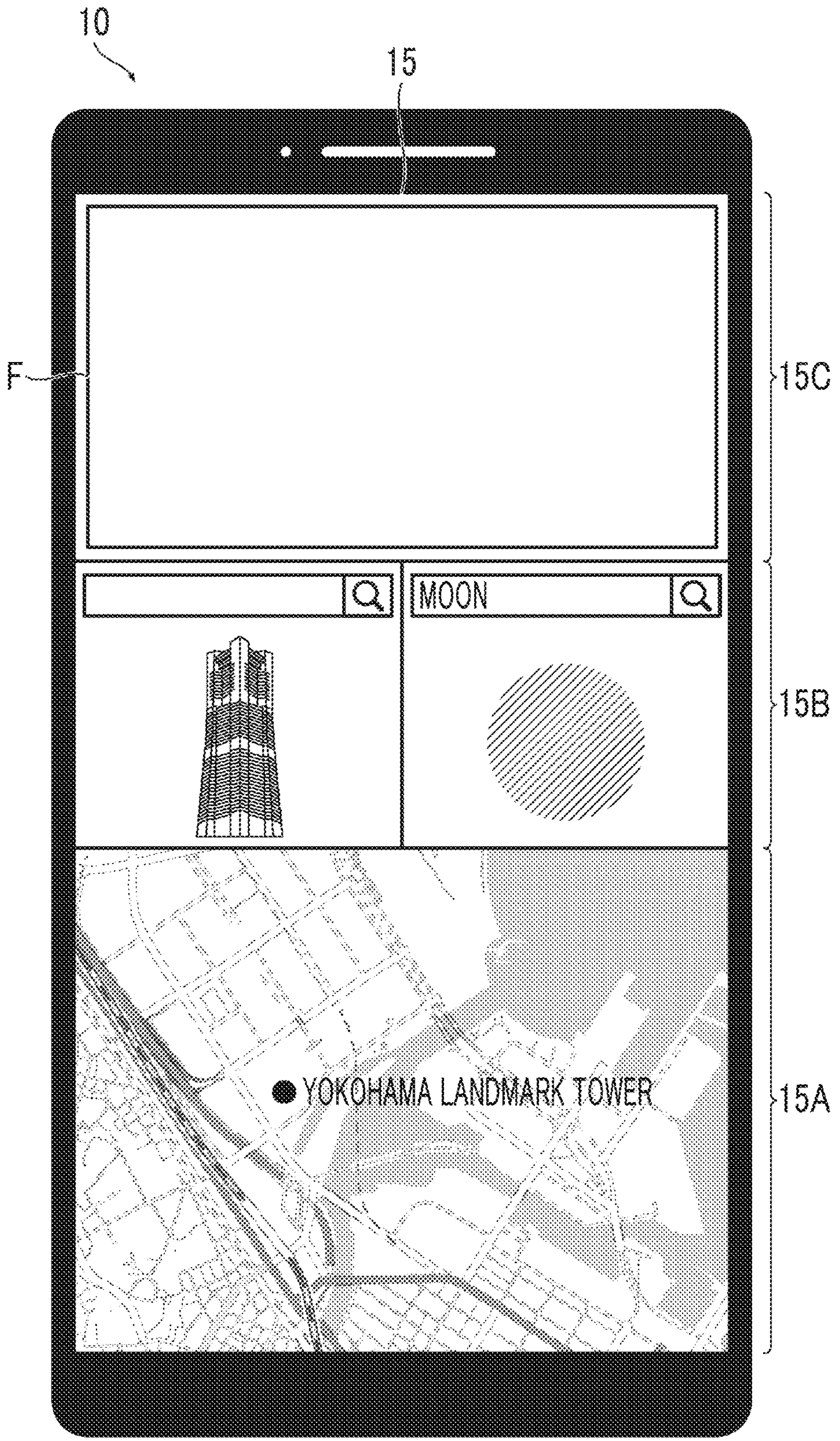
FIG. 25 is a diagram illustrating an example of a selection result of the subject.

FIG. 25 is a diagram illustrating an example of the selection result of the subject. FIG. 25 illustrates an example of a case where the first subject is selected using the map and the second subject is selected using the name. In addition, FIG. 25 illustrates a case where an object (fixed object) of which the geographical position is fixed is selected as the first subject and a celestial body, specifically the moon, is selected as the second subject.

Then, the icon displayed in each icon display region is dragged to the composition setting region 15C to set the composition. The setting operation of the composition is the same as that in the first embodiment. In a case where the celestial body is selected as the imaging target, it is assumed that the size of the celestial body cannot be adjusted. Accordingly, in a case where the subject is selected as the imaging target, only the position is adjusted.

Figure 26:
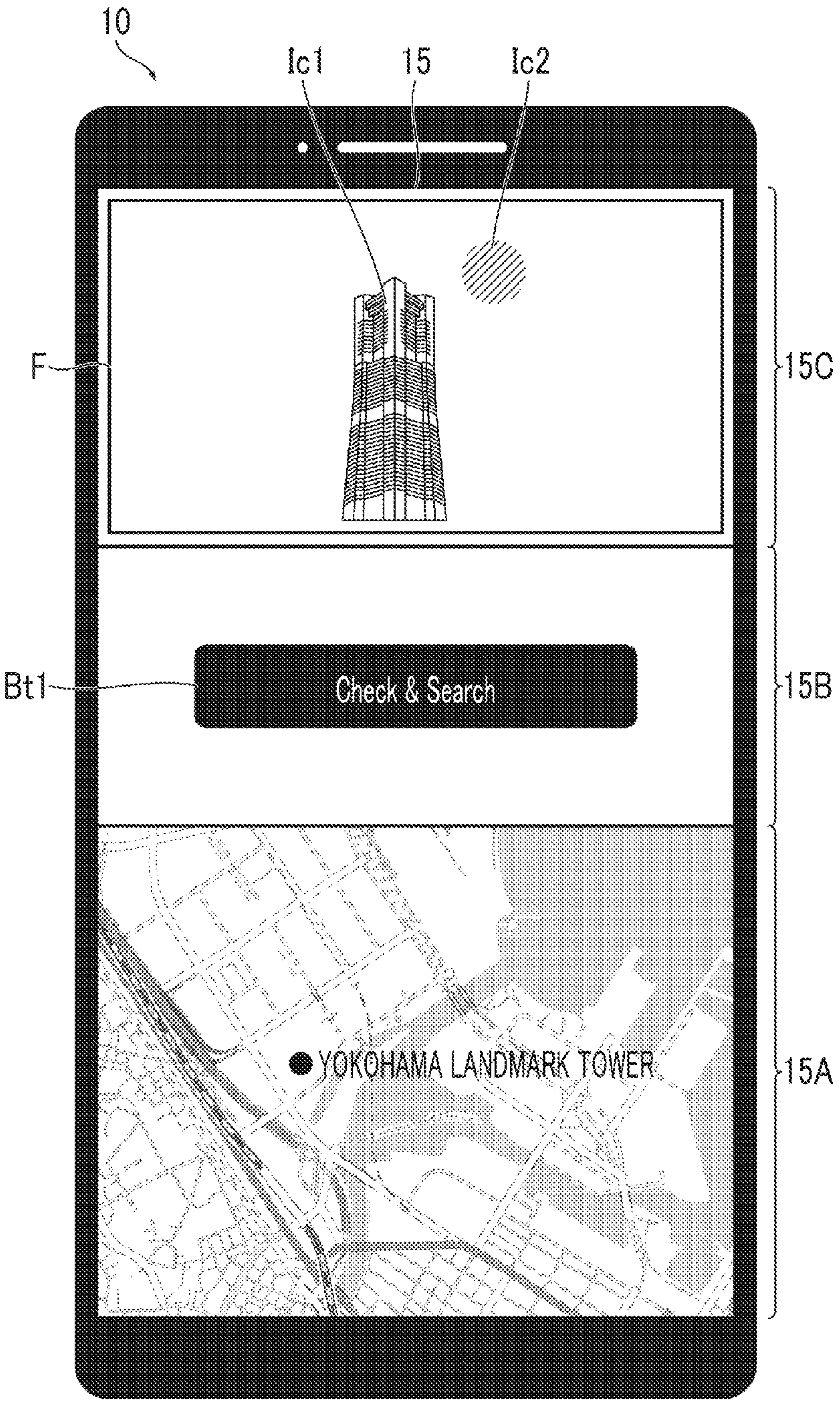
FIG. 26 is a diagram illustrating an example of the set composition.

FIG. 26 is a diagram illustrating an example of the set composition.

The user sets the desired composition by adjusting the positions and the sizes of the icons Ic1 and Ic2 in the composition setting region 15C. Then, the instruction to start the estimation processing of the imaging position is provided by touching the Check & Search button Bt1 displayed in the information display region 15B.

Estimation of Imaging Position

Figure 27:
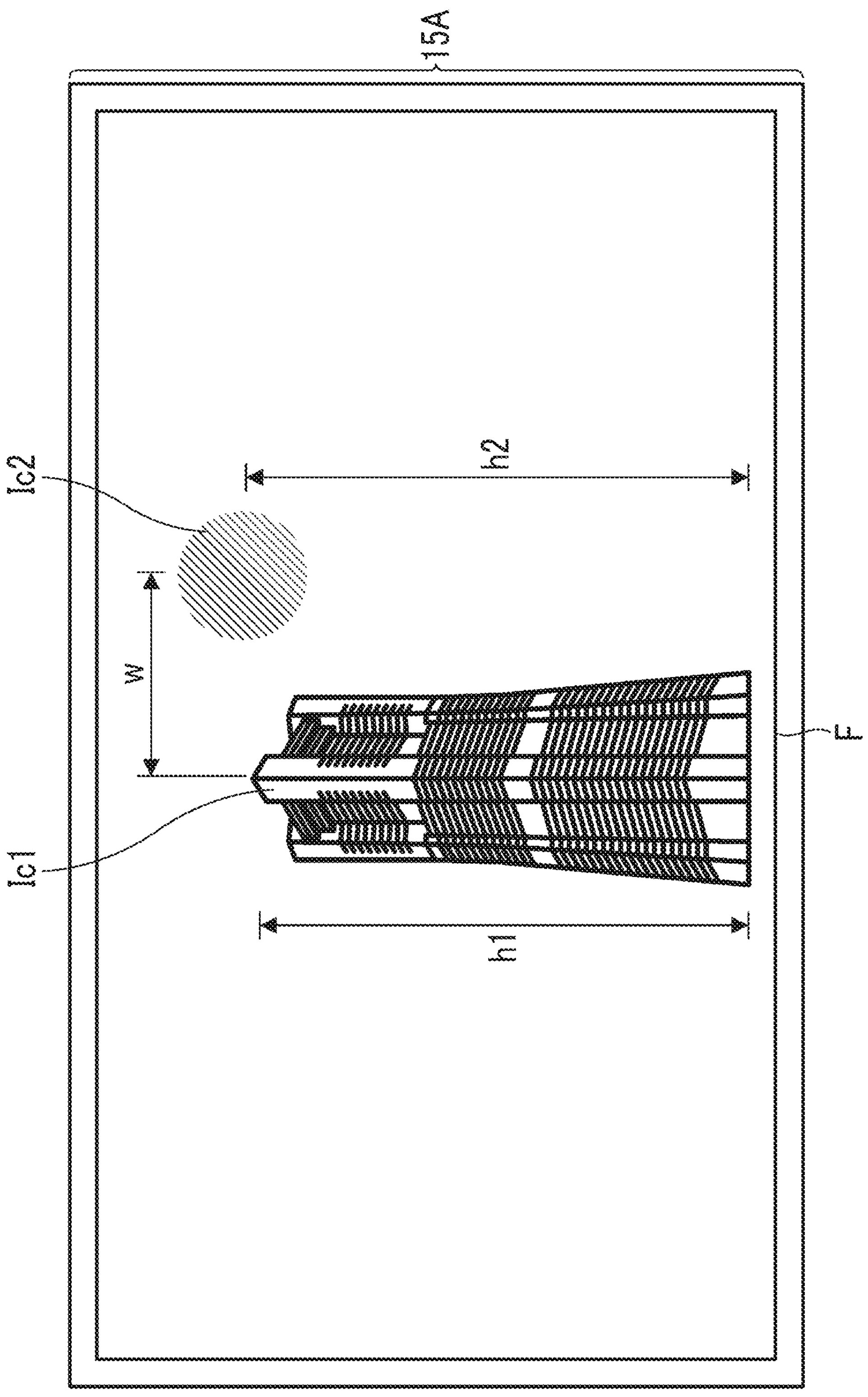
FIG. 27 is a diagram illustrating an example of the set composition.

FIG. 27 is a diagram illustrating an example of the set composition. In addition, FIG. 28 is a conceptual diagram of a method of estimating the imaging position.

Figure 28:
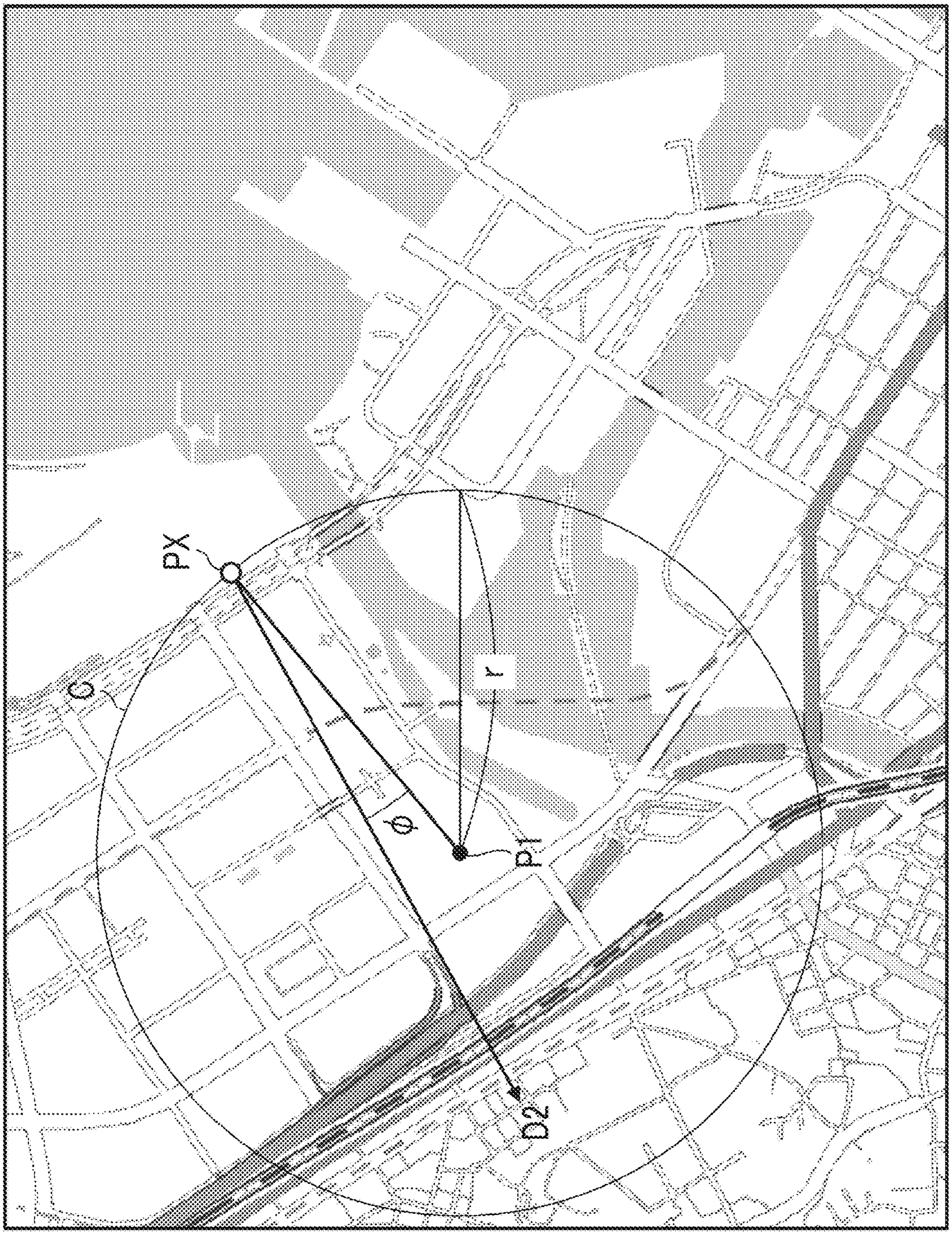
FIG. 28 is a conceptual diagram of a method of estimating the imaging position.

In FIG. 28, the point P1 is the geographical position of the first subject. In addition, a circle C of a radius r centered at the point P1 indicates the position at which the first subject can be imaged with the size in the set composition in a case where the lens is set to have the predetermined focal length fx [mm].

As illustrated in FIG. 27, in the set composition, a height of the first subject is denoted by h1, and a height of the second subject is denoted by h2. In addition, a distance between the first subject and the second subject is denoted by w. On the other hand, the actual height of the first subject is denoted by H1. In this case, an elevation angle θ (the altitude of the second subject) required for imaging the second subject with the height in the set composition at the focal length fx [mm] is obtained using the following expression.

$$\tan\theta=(H1/r)\times(h2/h1)$$

A distance within the composition can be converted into an angle using the above expression. Thus, the distance w between the first subject and the second subject within the composition can also be converted into an actual angle φ using the following expression.

$$\varphi=\theta\times(w/h2)$$

A date and time in which the second subject is at the elevation angle θ from the location at which the first subject is present is searched. An azimuth at which the second subject can be observed (imaged) on the searched date and time is obtained.

For the celestial body, a position (an elevation angle and an azimuth) of observation can be specified in a case where a location and a date and time of observation can be specified. Information about the position of the celestial body may be configured to be acquired from the information provision server 100 or may be configured to be obtained by calculation.

In FIG. 28, the azimuth indicated by an arrow D2 illustrates an example of the obtained azimuth. That is, an azimuth at which the second subject is to be present is illustrated. As illustrated in FIG. 28, an imaging position PX is specified as a point on the circle C in a case where the first subject is positioned in a direction shifted by the angle φ from the azimuth (arrow D2) at which the second subject is to be present. In other words, an intersection between the circle C and a half-line drawn from the first subject in the direction shifted by the angle φ from the azimuth (arrow D2) at which the second subject is to be present is the imaging position PX.

The imaging position is estimated through the above series of steps. As described above, in a case where the celestial body is set as the imaging target, a date and time of imaging are also estimated in addition to the imaging position.

Figure 29:
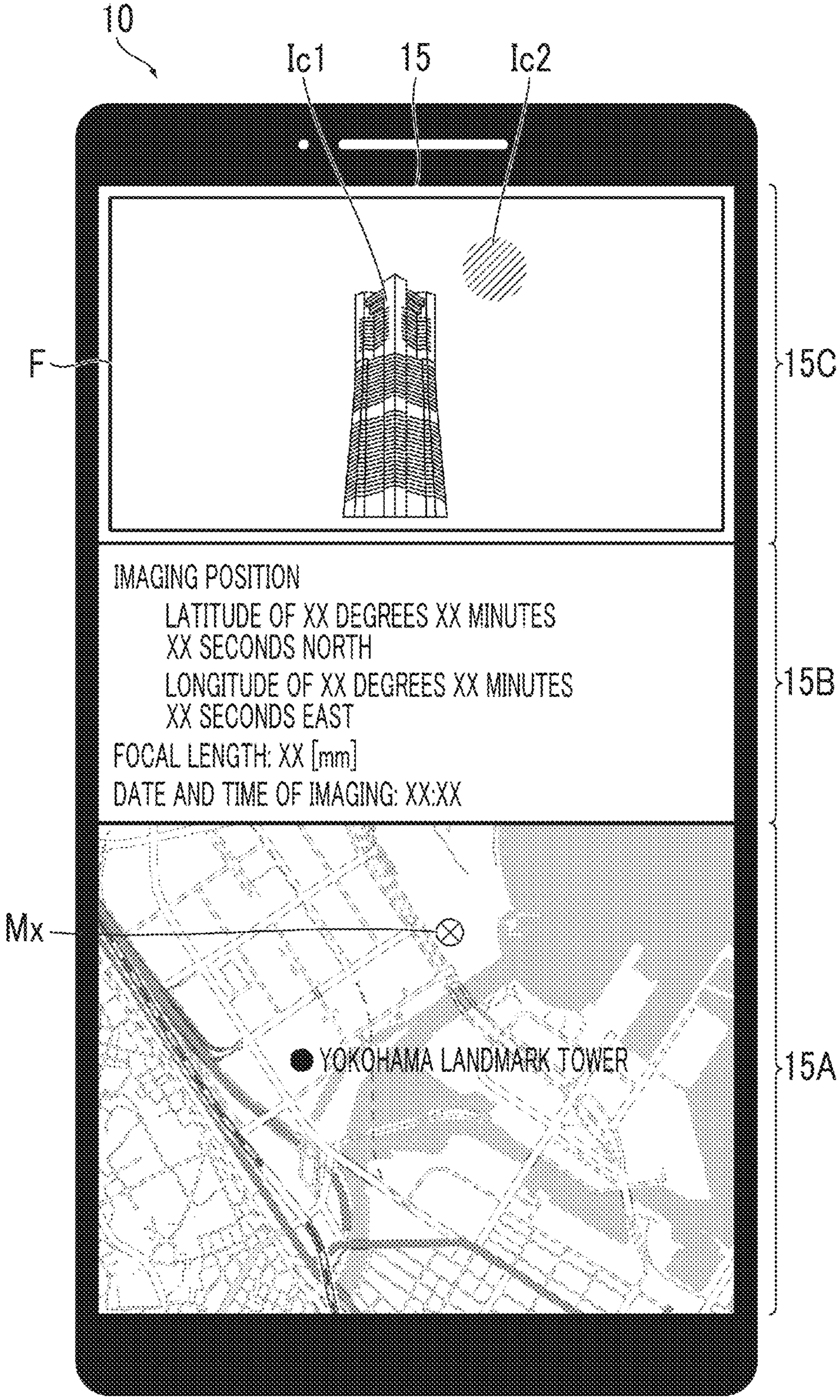
FIG. 29 is a diagram illustrating an example of display of the result of the estimation processing.

FIG. 29 is a diagram illustrating an example of display of the result of the estimation processing.

As illustrated in FIG. 29, in a case where the imaging position is estimated, the mark Mx indicating the imaging position is displayed on the map displayed in the map display region 15A. In addition, each of the information about the latitude and the longitude of the estimated imaging position, the information about the focal length in imaging, and information about the date and time of imaging is displayed in the information display region 15B. By viewing this display, the user can perceive the imaging condition (the focal length and the date and time of imaging) and the position at which the composition set by the user can be captured.

Modification Example

While it is configured to also estimate the date and time of imaging in addition to the imaging position in the embodiment, it may be configured to determine the availability of imaging by receiving a setting of the date and time of imaging from the user. That is, it may be configured to determine whether or not the image of the set composition can be captured on the set date and time. The availability of imaging is determined by determining whether or not the date and time in which the second subject is at the elevation angle θ from the location at which the first subject is present matches the designated date and time. In a case where the date and time do not match the designated date and time, it is determined that imaging is unavailable. It may be configured to designate the date and time by setting a range.

Third Embodiment

According to the imaging position estimation system of the first and second embodiments, the position at which the desired composition can be captured can be estimated. However, in a case where imaging is actually performed from the estimated position, an obstacle may be present, and a desired image may not be captured. In the present embodiment, a case of determining the availability of imaging by determining whether or not the obstacle is present will be described.

Figure 30:
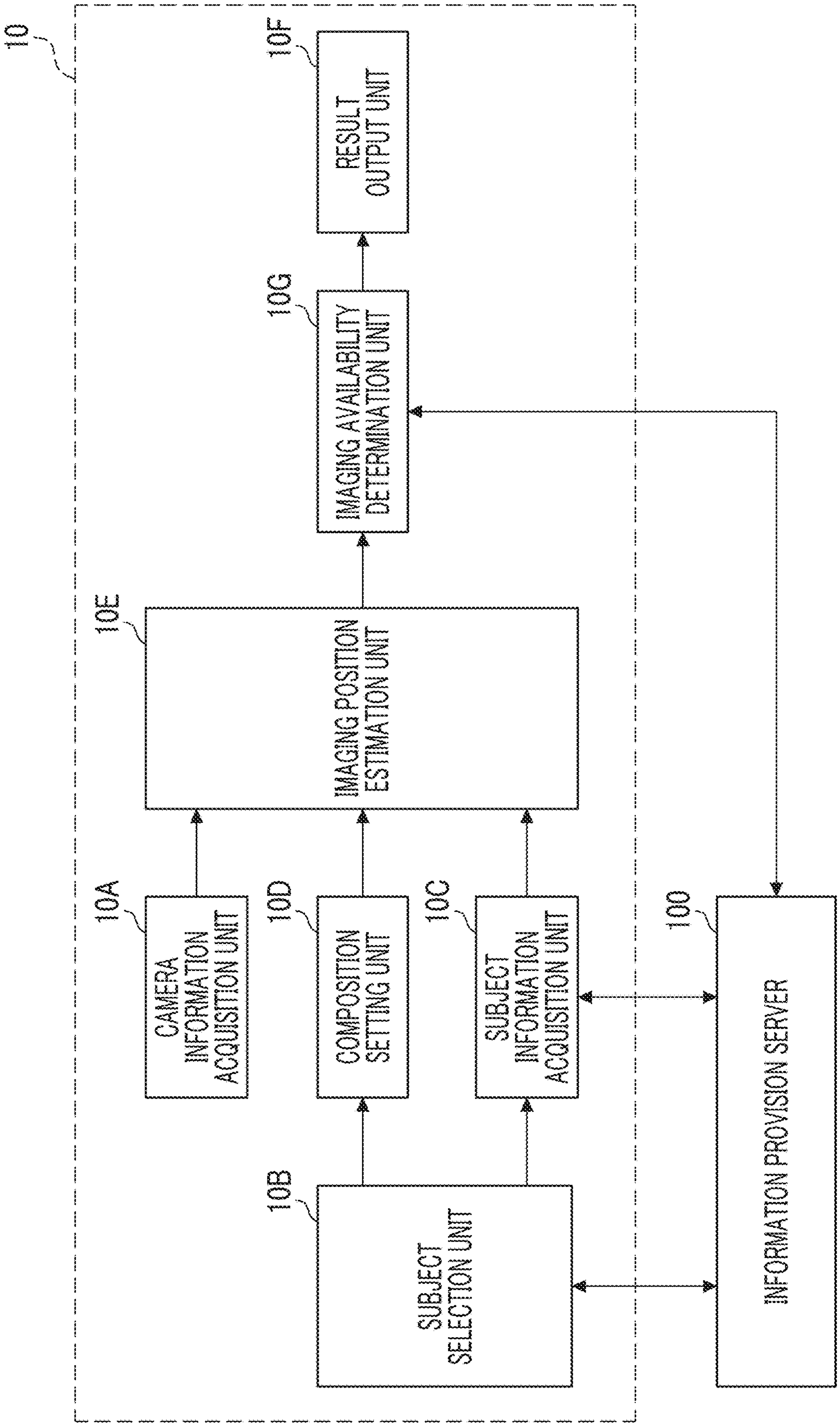
FIG. 30 is a block diagram of main functions implemented by the user terminal.

FIG. 30 is a block diagram of main functions implemented by the user terminal.

As illustrated in FIG. 30, the user terminal 10 of the present embodiment further has a function of an imaging availability determination unit 10G. Other functions are substantially the same as those in the first embodiment. Thus, the function of the imaging availability determination unit 10G will be described here. The function of the imaging availability determination unit 10G is implemented by executing a predetermined program via the CPU 11.

The imaging availability determination unit 10G acquires the information about the imaging position estimated by the imaging position estimation unit 10E and the focal length and determines whether or not an object (obstacle) that obstructs imaging is present based on the acquired information about the imaging position and the focal length and on the information about the positions of the first subject and the second subject. That is, whether or not the obstacle is present within an angle of view in the case of imaging the first subject and the second subject from the estimated imaging position is determined. Specifically, the obstacle between the imaging position and the first subject and the second subject is detected. Information about the obstacle is stored in the information database 100D of the information provision server 100. For example, an object exceeding a defined size is registered as the obstacle together with information about a position and a size of the object. The imaging availability determination unit 10G detects the obstacle based on the information stored in the information database 100D. In a case where the obstacle is detected, it is determined that imaging is unavailable.

In a case where the imaging availability determination unit 10G determines that imaging is unavailable, a message indicating that imaging is unavailable because of the presence of the obstacle is displayed on the display 15. In a case where it is determined that imaging is available, the information about the imaging position and the focal length is displayed on the display 15 as usual (refer to FIG. 18).

According to the present embodiment, the imaging position is estimated by considering the obstacle. Accordingly, the position at which the image of the desired composition can be more securely captured can be presented.

Fourth Embodiment

According to the imaging position estimation system of the first and second embodiments, in a case where the imaging position cannot be estimated, it is determined that imaging is unavailable. However, imaging may become available by making simple correction to the composition set by the user. For example, in a case where imaging cannot be performed with the set composition because the front and rear disposition relationship between two subjects is unsuitable, imaging may become available by reversing the front and rear disposition relationship between the two subjects. In addition, in a case where imaging cannot be performed with the set composition because two subjects are excessively close to each other, imaging may become available by increasing the interval between the two subjects. Similarly, in a case where imaging cannot be performed with the set composition because two subjects are excessively separated from each other, imaging may become available by narrowing the interval between the two subjects. In the present embodiment, a case of automatically correcting the composition and presenting the composition to the user in a case where the imaging position cannot be estimated in the composition set by the user will be described.

Figure 31:
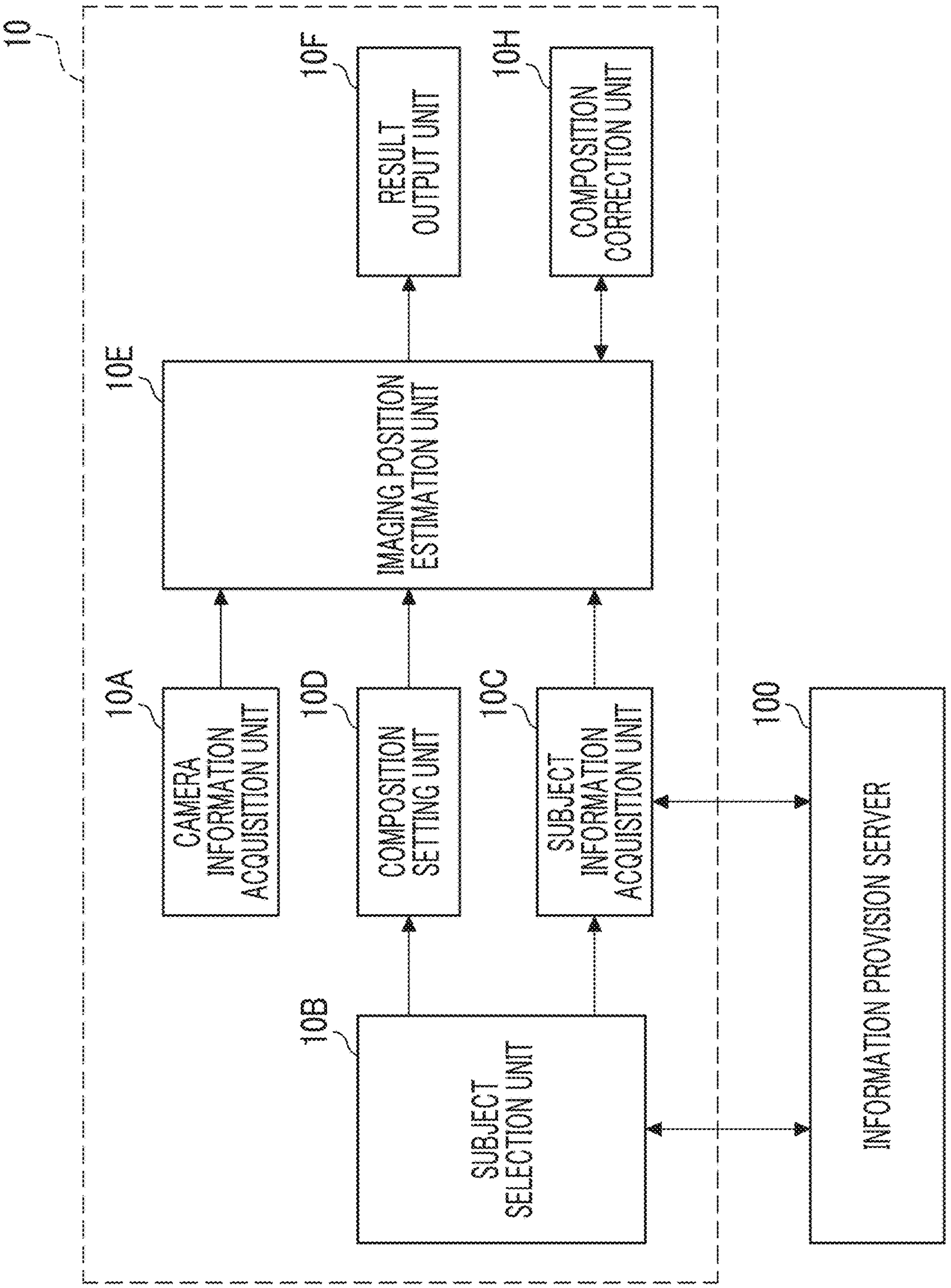
FIG. 31 is a block diagram of main functions implemented by the user terminal.

FIG. 31 is a block diagram of main functions implemented by the user terminal.

As illustrated in FIG. 31, the user terminal 10 of the present embodiment further has a function of a composition correction unit 10H. Other functions are substantially the same as those in the first embodiment. Thus, the function of the composition correction unit 10H will be described here. The function of the composition correction unit 10H is implemented by executing a predetermined program via the CPU 11.

The composition correction unit 10H performs processing of correcting the composition set by the user in a case where the imaging position estimation unit 10E determines that imaging is unavailable. As described above, in a case where the imaging position cannot be estimated, the imaging position estimation unit 10E determines that imaging is unavailable with the set composition. In a case where the imaging position cannot be estimated, the composition correction unit 10H corrects the composition set by the user through a predetermined procedure.

(1) Correction of Size of Subject

In the set composition, in a case where the imaging position cannot be estimated because the sizes of the first subject and the second subject are unsuitable, the composition is corrected by correcting the sizes of the first subject and the second subject. The imaging position estimation unit 10E performs the processing of estimating the imaging position again with respect to the composition after correction.

Figure 32:
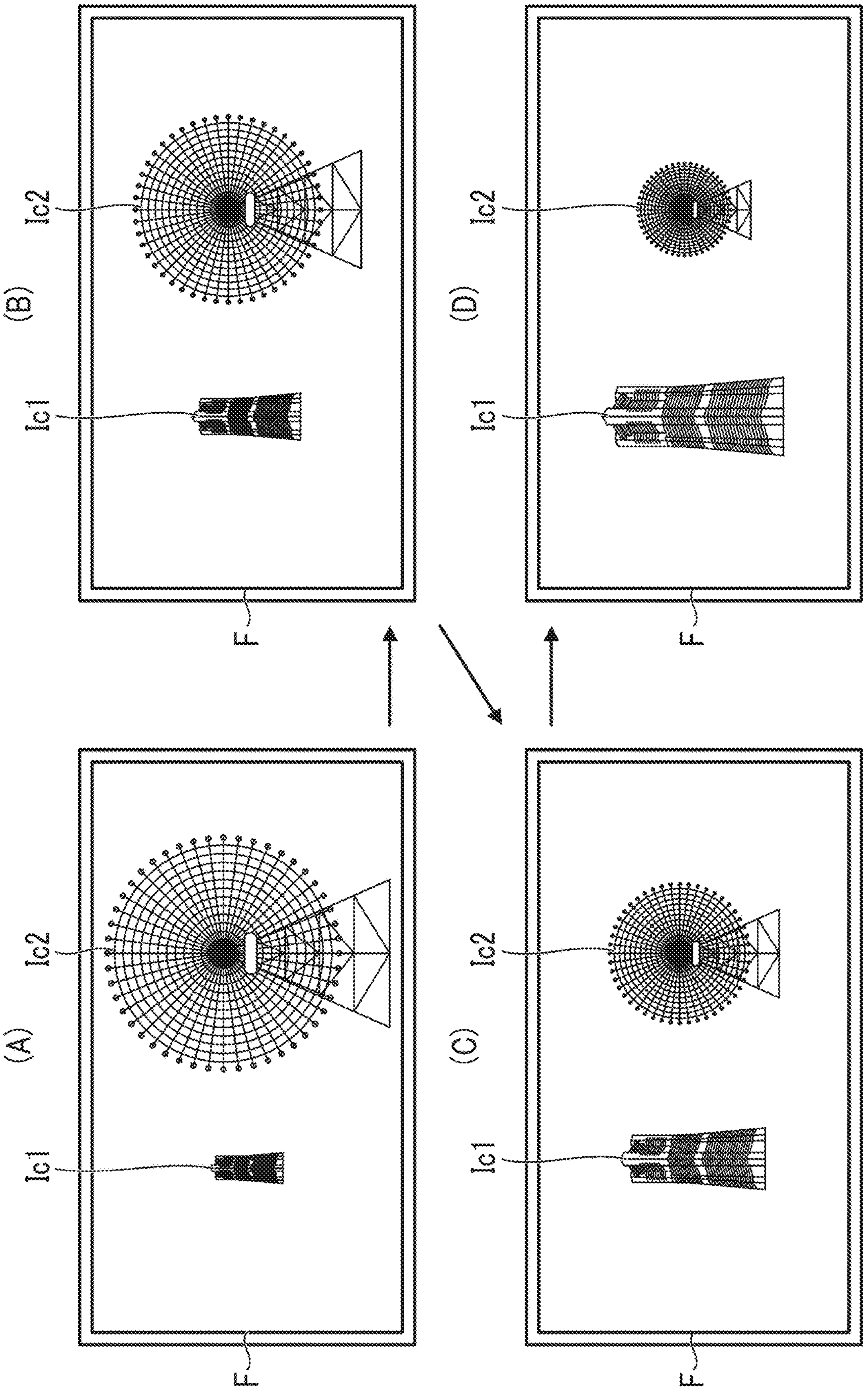
FIG. 32 is a diagram illustrating an example of correction of a size.

FIG. 32 is a diagram illustrating an example of correction of the size. (A) of FIG. 32 illustrates the composition before correction, (B) and (C) of FIG. 32 illustrate the composition in the middle of correction, and (D) of FIG. 32 illustrates the composition after correction is completed.

As illustrated in FIG. 32, for example, correction of the size is performed with respect to both of the first subject and the second subject and is performed in a stepwise manner using a constant ratio. In a case where the imaging position cannot be estimated after the size is corrected to a predetermined ratio, it is determined that imaging is unavailable.

In a case where, for example, the first subject and the second subject are disposed in a superimposed manner in the set composition, the composition may be corrected by changing the front and rear positional relationship between the first subject and the second subject. In this case, front and rear disposition of the first subject and the second subject is reversed.

In a case where the imaging position is estimated in the corrected composition, the corrected composition is displayed in the composition setting region 15C.

(2) Correction of Front and Rear Positional Relationship

In the set composition, in a case where the imaging position cannot be estimated because the front and rear positional relationship between the first subject and the second subject is unsuitable, the composition is corrected by correcting the front and rear positional relationship between the first subject and the second subject. The unsuitable front and rear positional relationship means, for example, a case where a subject that is originally to be imaged to be large is imaged to be small and is imaged at a front position.

Figure 33:
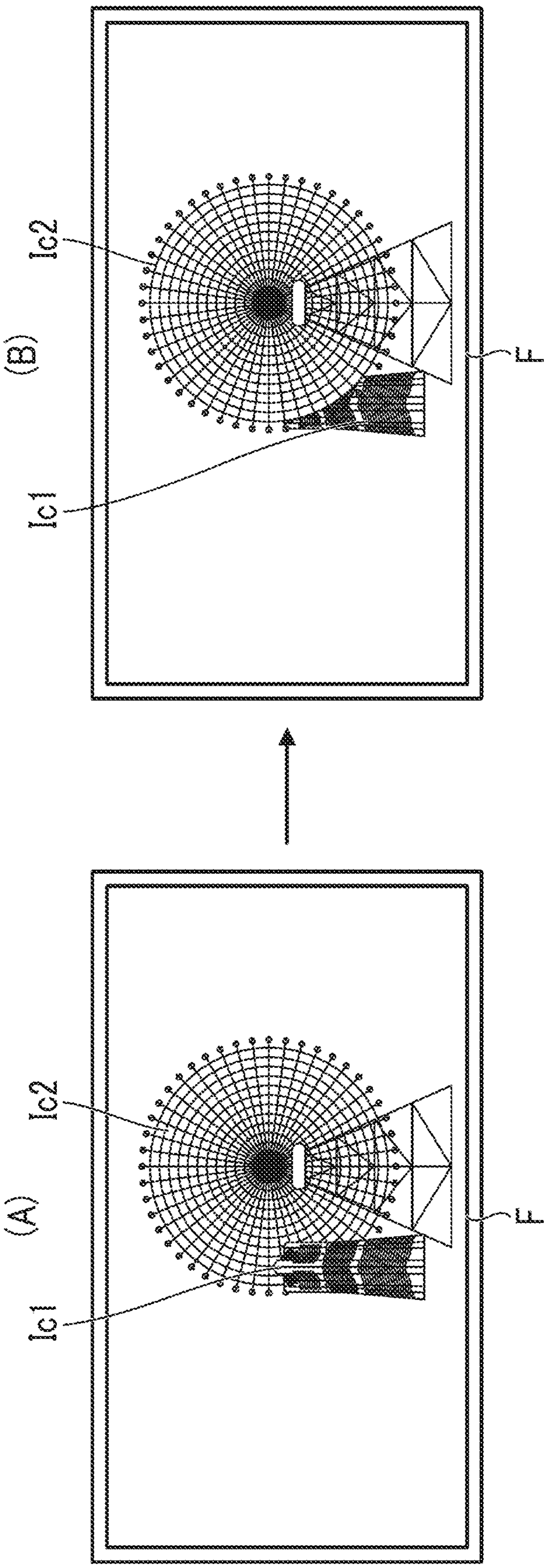
FIG. 33 is a diagram illustrating an example of correction of a front and rear positional relationship.

FIG. 33 is a diagram illustrating an example of correction of the front and rear positional relationship. (A) of FIG. 33 illustrates the composition before correction. (B) of FIG. 33 illustrates the composition after correction.

As illustrated in FIG. 33, the composition correction unit 10H corrects the composition by reversing front and rear disposition of the first subject and the second subject. The imaging position estimation unit 10E performs the processing of estimating the imaging position again with respect to the composition after correction. In a case where the imaging position cannot be estimated in the composition after correction, it is determined that imaging is unavailable.

In a case where the imaging position is estimated in the corrected composition, the corrected composition is displayed in the composition setting region 15C.

(3) Correction of Distance Between Subjects

In the set composition, in a case where the imaging position cannot be estimated because the distance (interval) between the subjects is unsuitable, the composition is corrected by correcting the distance between the subjects.

Figure 34:
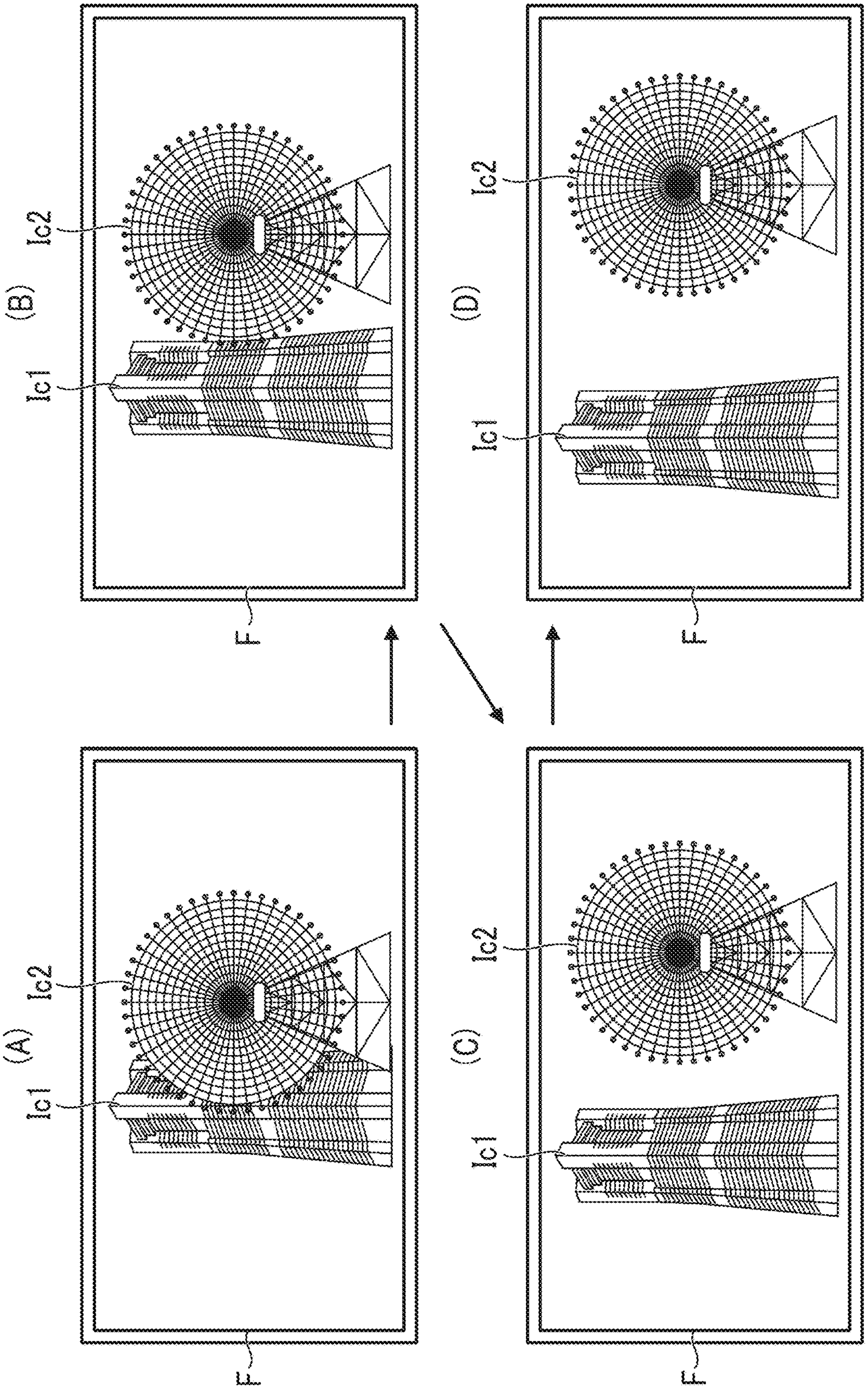
FIG. 34 is a diagram illustrating an example of correction of a distance between subjects.

FIG. 34 is a diagram illustrating an example of correction of the distance between the subjects. FIG. 34 illustrates an example of correction of the distance in a case where the distance between the subjects is excessively short. (A) of FIG. 34 illustrates the composition before correction, (B) and (C) of FIG. 34 illustrate the composition in the middle of correction, and (D) of FIG. 34 illustrates the composition after correction is completed.

As illustrated in FIG. 34, in a case where the imaging position cannot be estimated because the distance between the subjects is excessively short, the composition is corrected by increasing the distance between the subjects in a stepwise manner. The distance is increased in a stepwise manner at a constant ratio. Correction is finished in a stage where the imaging position is estimated. On the other hand, in a case where the imaging position cannot be estimated after correction is performed to a predetermined ratio, it is determined that imaging is unavailable.

In a case where the imaging position cannot be estimated because the distance between the subjects is excessively long, correction is performed in the direction of decreasing the distance between the subjects.

In correcting the distance, for example, correction is first performed in the direction of decreasing the distance. In a case where the imaging position cannot be estimated by performing correction in the direction of decreasing the distance, correction is performed in the direction of increasing the distance. Alternatively, correction is performed in reverse.

In a case where the imaging position is estimated in the corrected composition, the corrected composition is displayed in the composition setting region 15C.

According to the present embodiment, in a case where imaging cannot be performed with the composition set by the user, the imaging position can be presented to the user by automatically performing correction to similar composition. Accordingly, convenience can be improved.

Modification Example

The above correction can be performed in combination with each other, as appropriate. In this case, for example, each correction is performed in a predetermined order, and processing is finished in a stage where the imaging position is estimated.

Even in a case where it is determined that imaging is unavailable because of the presence of the obstacle, it may be configured to correct the composition in the same manner. That is, correction is performed to composition in which the first subject and the second subject can be imaged by avoiding the obstacle. In this case, for example, the composition is corrected by correcting the position of the subject blocked by the obstacle.

Figure 35:
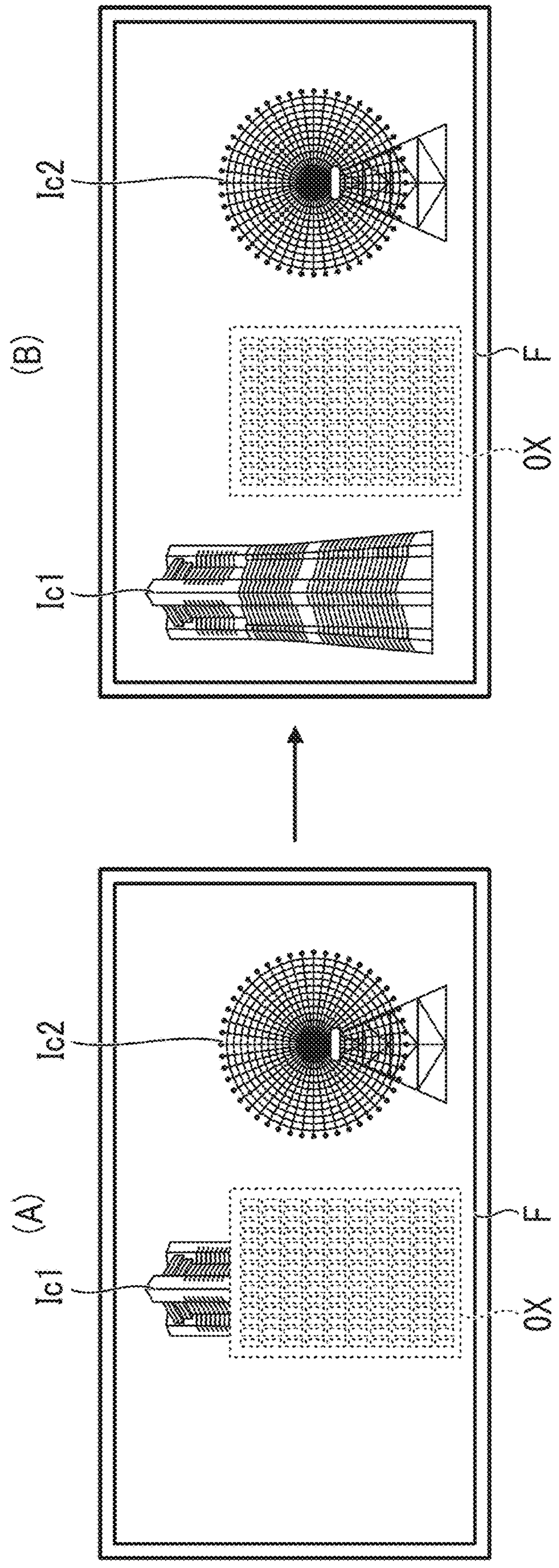
FIG. 35 is a diagram illustrating an example of correction in a case where an obstacle is present.

FIG. 35 is a diagram illustrating an example of correction in a case where the obstacle is present. FIG. 35 illustrates a correction example in a case where an obstacle OX is present in front of the first subject. (A) of FIG. 35 illustrates the composition before correction, and (B) of FIG. 35 illustrates the composition after correction.

As illustrated in FIG. 35, in a case where it is determined that imaging is unavailable because of the presence of the obstacle OX in front of the first subject, the composition is corrected by moving the position of the first subject. That is, the first subject is moved to a position not hidden by the obstacle.

In addition, in a case where the imaging position cannot be estimated because the front and rear positional relationship between the first subject and the second subject is unsuitable, a method of performing correction to composition in which a depth relationship is not known can also be employed in addition to reversing the front and rear positional relationship.

Fifth Embodiment

According to the imaging position estimation system of the first embodiment, the position at which the desired composition can be captured can be estimated. However, the estimated position may be a location at which a person cannot enter. In this case, it is required to change the composition or change the position for imaging. In the case of changing the position for imaging, convenience is improved in a case where how the composition will change can be perceived in advance. In the present embodiment, a case where a function of correcting the imaging direction in addition to the estimated imaging position and a function of presenting the composition that can be captured in a case where the imaging position and/or the imaging direction is corrected are comprised will be described.

Figure 36:
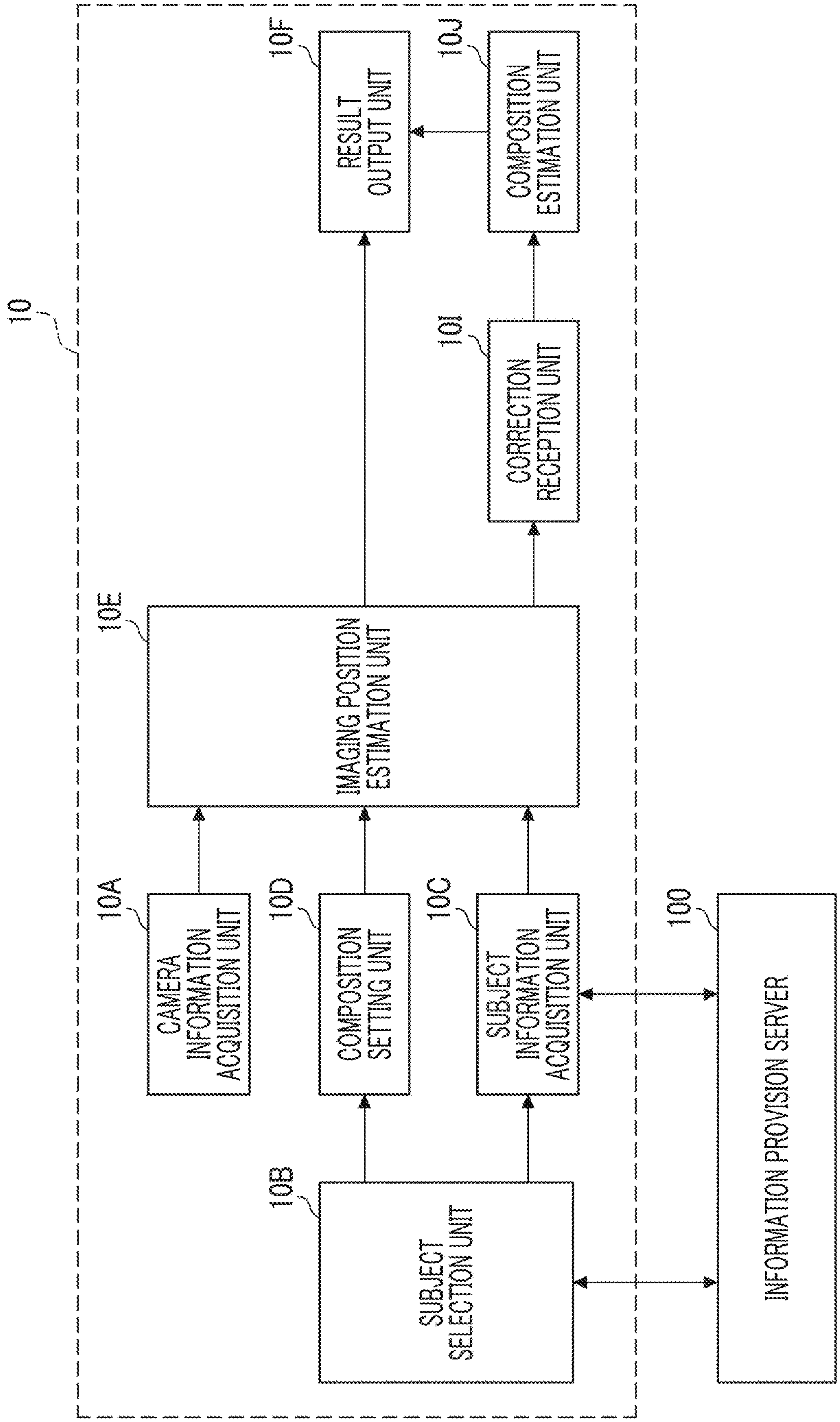
FIG. 36 is a block diagram of main functions implemented by the user terminal.

FIG. 36 is a block diagram of main functions implemented by the user terminal.

As illustrated in FIG. 36, the user terminal 10 of the present embodiment further has functions of a correction reception unit 10I and a composition estimation unit 10J. Other functions are substantially the same as those in the first embodiment. Thus, here, the functions of the correction reception unit 10I and the composition estimation unit 10J will be mainly described. The functions of the correction reception unit 10I and the composition estimation unit 10J are implemented by executing a predetermined program via the CPU 11.

The correction reception unit 10I performs processing of receiving correction of the imaging position and the imaging direction. The imaging position is corrected by moving the mark Mx indicating the imaging position displayed on the display 15. In addition, the imaging direction is corrected by changing a direction of the arrow Dx indicating the imaging direction displayed on the display 15.

Figure 37:
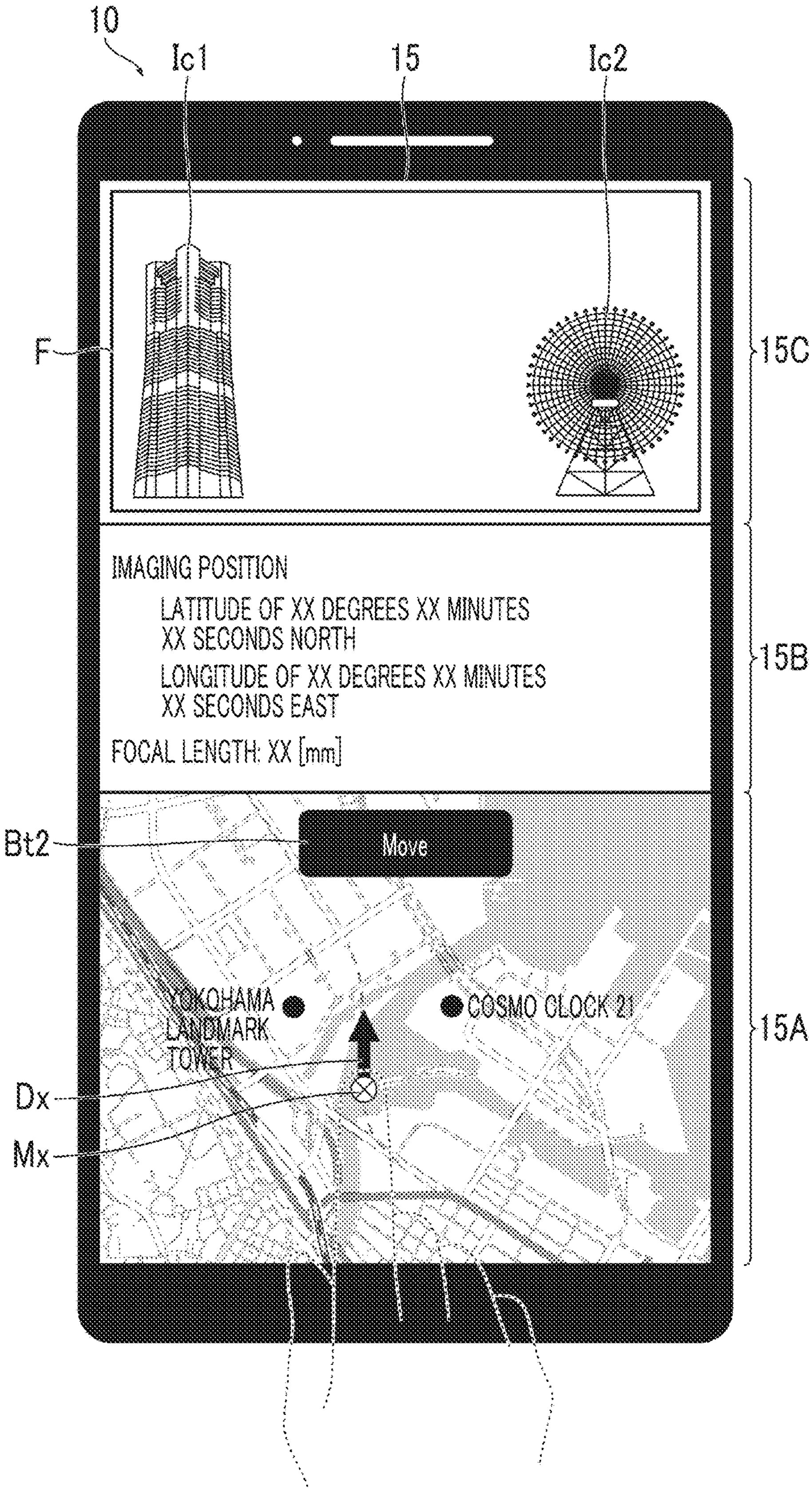
FIG. 37 is a diagram illustrating an example of a screen for receiving correction of the imaging position and the imaging direction.

FIG. 37 is a diagram illustrating an example of a screen for receiving correction of the imaging position and the imaging direction. As illustrated in FIG. 37, a predetermined button (Move button) Bt2 is displayed in the map display region 15A in a superimposed manner on the map. The imaging position and the imaging direction can be corrected by touching the Move button Bt2. In the case of correcting the imaging position, the mark Mx is touched and is moved while the touch is maintained. In the case of correcting the imaging direction, the arrow Dx is touched and is moved (rotated) while the touch is maintained. The arrow Dx is assumed to rotate about the mark Mx.

In a case where the imaging position is corrected, the composition estimation unit 10J performs processing of estimating the composition to be captured from the corrected imaging position and the imaging direction.

The result output unit 10F displays the composition estimated by the composition estimation unit 10J in the composition setting region 15C.

According to the present embodiment, in a case where the imaging position and/or the imaging direction is corrected, the composition of the image to be captured after correction can be presented. Accordingly, the image of the composition captured by the user can be simply captured.

Modification Example

While a case of correcting the imaging position and the imaging direction has been described in the embodiment, it may be configured to also correct the focal length.

Sixth Embodiment

A case of imaging the subject having a known position and size has been described in the series of embodiments. In the present embodiment, a case of imaging an object having an unknown position and/or size as the subject will be described.

In a case where the position and/or the size of the subject to be set as the imaging target is unknown, these pieces of information are acquired by actual measurement. In the present embodiment, the position and the size are measured by three-dimensionally scanning the imaging target using the range measurement sensor.

Figure 38:
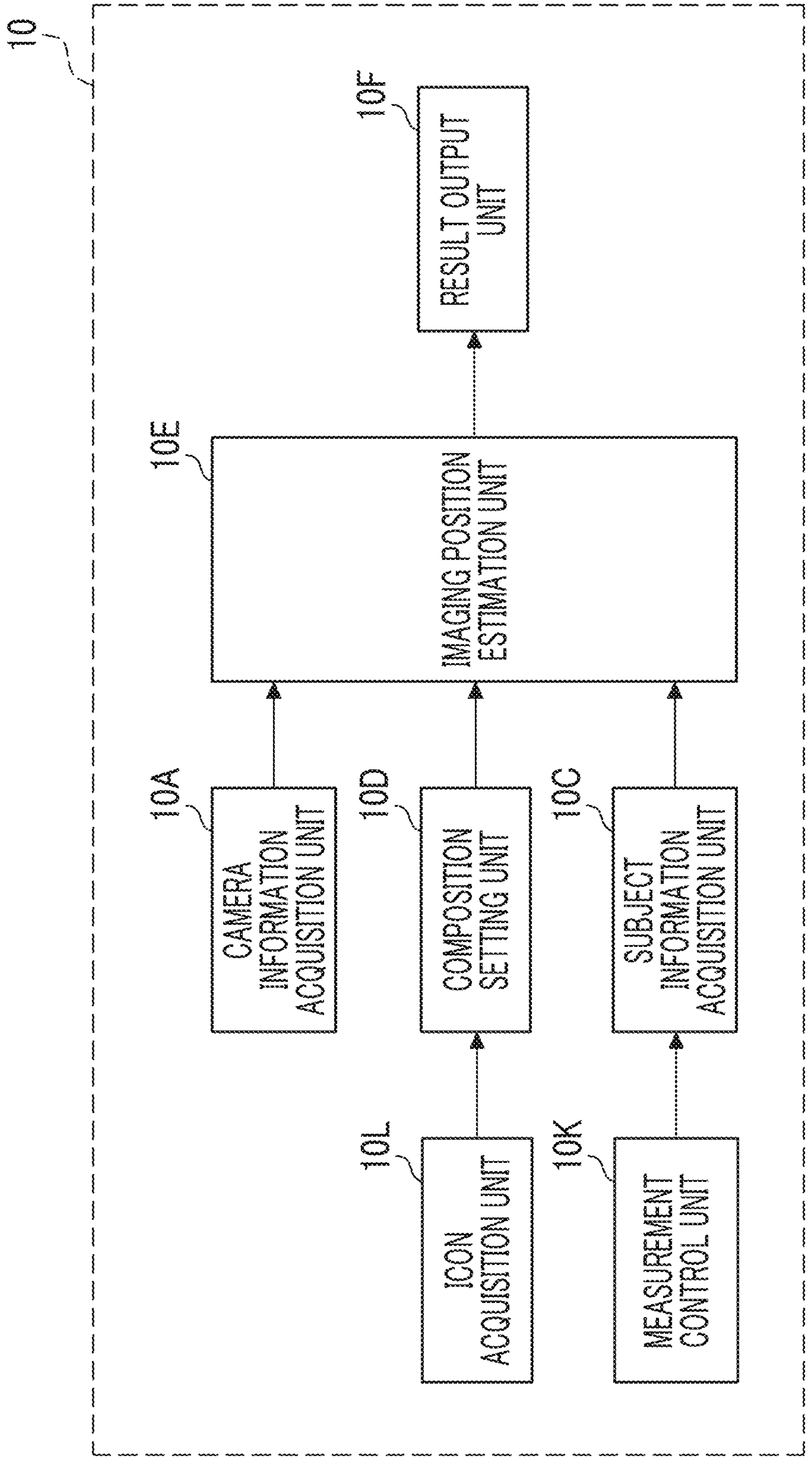
FIG. 38 is a block diagram of main functions implemented by the user terminal.

FIG. 38 is a block diagram of main functions implemented by the user terminal.

As illustrated in FIG. 38, the user terminal 10 of the present embodiment further has functions of a measurement control unit 10K and an icon acquisition unit 10L. Other functions are substantially the same as those in the first embodiment. Thus, here, the functions of the measurement control unit 10K and the icon acquisition unit 10L will be mainly described. The functions of the measurement control unit 10K and the icon acquisition unit 10L are implemented by executing a predetermined program via the CPU 11.

The measurement control unit 10K performs processing of controlling the sensor unit 23 to measure the position and the size of the subject to be set as the imaging target. In the present embodiment, the position and the size are measured by three-dimensionally scanning the subject to be set as the imaging target using the range measurement sensor.

Figure 39:
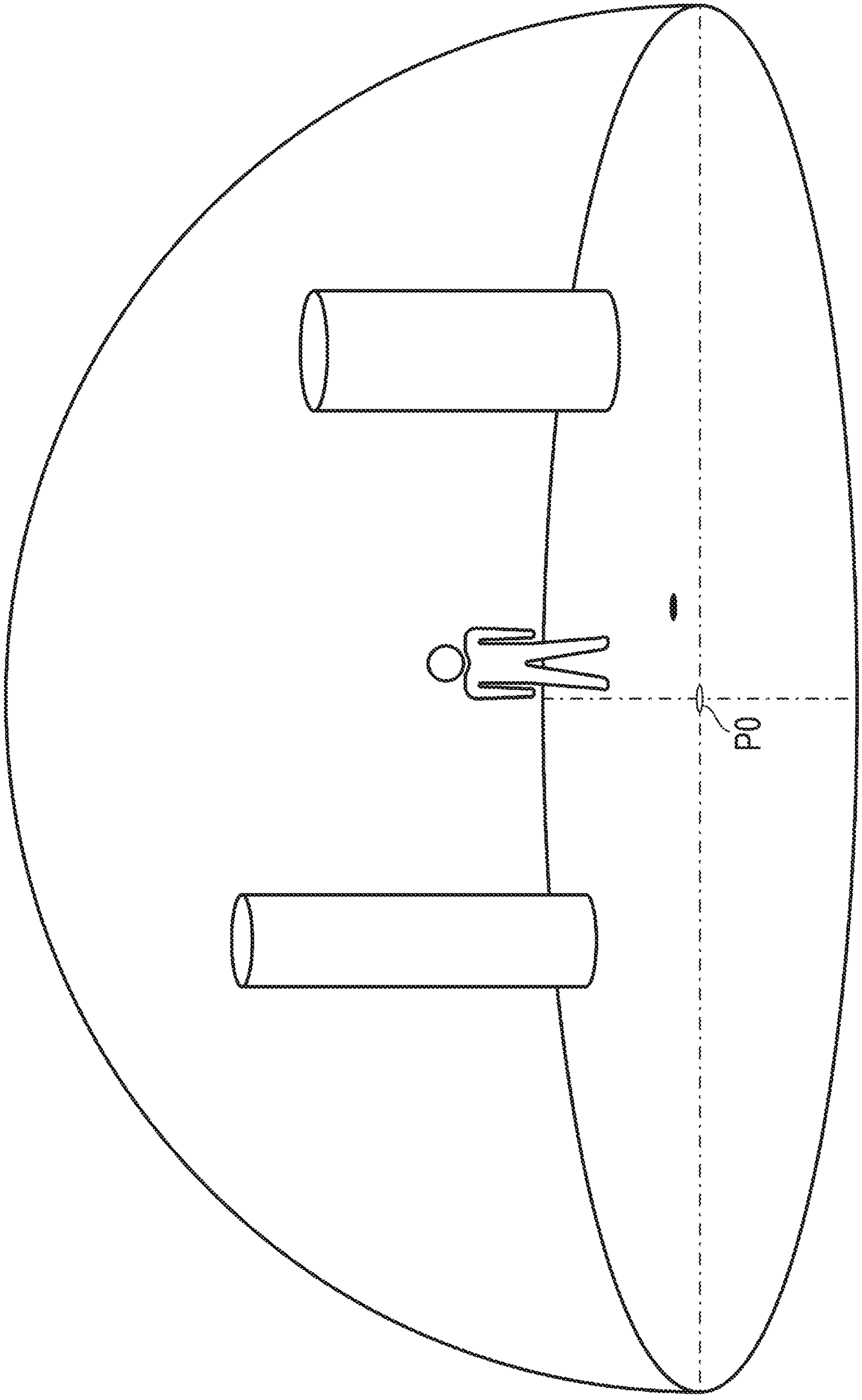
FIG. 39 is a conceptual diagram of measurement of a space.

FIG. 39 is a conceptual diagram of measurement of a space.

As illustrated in FIG. 39, the position and the size of the subject to be set as the imaging target are measured based on a predetermined position PO in a real space.

The icon acquisition unit 10L performs processing of acquiring information about the icon of the subject to be set as the imaging target. In the present embodiment, the icon is acquired by imaging the subject to be set as the imaging target. Specifically, an image obtained by extracting the subject part from the image obtained by imaging the subject to be set as the imaging target is used as the icon.

The composition setting unit 10D receives input of the composition using the icon acquired by the icon acquisition unit 10L.

The imaging position estimation unit 10E estimates the position at which the image of the composition set by the composition setting unit 10D can be captured based on the information about the position and the size of the subject (the first subject and the second subject) acquired by measurement performed by the measurement control unit 10K.

According to the present embodiment, even in the case of imaging the subject having an unknown position and/or size, the position at which the image of the desired composition can be captured can be estimated.

Modification Example

While it is configured to generate and acquire the icon from the image obtained by actually imaging the subject in the embodiment, a method of acquiring the icon of the subject is not limited thereto. As another method, for example, it can be configured to prepare icons of a plurality of target objects (subject candidates) in advance and cause the user to select the icon. In addition, the icon can be substituted with, for example, a rectangular frame. In this case, it is preferable to set the icon of the subject to be set as the target by causing the user to input an aspect ratio.

Other Embodiments (1) Navigation Function

A function of providing guidance to the estimated imaging position in a case where the imaging position can be estimated may be further comprised. That is, a navigation function may be further comprised. In this case, the user terminal 10 further comprises a function of acquiring information about a current location, a function of generating guidance information for leading to the imaging position based on the acquired information about the current location, a guiding function based on the generated guidance information, and the like. For example, the guiding function is performed by displaying the generated guidance information on the display 15. These functions can be implemented using a well-known navigation technology.

(2) Imaging Guiding Function

A guiding function of the imaging direction in a case where the imaging direction is estimated may be further comprised. That is, a function of showing a direction for imaging at the actual imaging position to the user may be comprised. In this case, the user terminal comprises a function of acquiring information about a direction of the camera (information about a direction of an optical axis), a function of obtaining a direction in which the camera is to be directed based on the acquired information about the direction of the camera, a function of providing notification of the obtained direction, and the like. For example, notification of the obtained direction is performed by displaying the information about the direction on the display. At this point, it is more preferable to display the information about the direction in a superimposed manner on a live view image.

In addition, the image of the composition set by the user may be displayed in a superimposed manner on the live view image. At this point, for example, the image of the composition is displayed to be semi-transparent. Accordingly, the image of the set composition can be more simply captured.

(3) Automatic Imaging

In a case where the imaging position and the imaging direction are estimated, it can be configured to automatically perform imaging based on the estimated imaging position and the estimated imaging direction. For example, in the case of performing imaging using a camera mounted in an unmanned vehicle, an unmanned aerial vehicle, an unmanned surface vehicle, or the like, it can be configured to automatically perform imaging by providing information about the estimated imaging position and the estimated imaging direction to these apparatuses. Since the unmanned vehicle, the unmanned aerial vehicle, the unmanned surface vehicle, and the like in which the camera is mounted, and the technology itself for automatically performing imaging using these apparatuses are well known, description of their details will be omitted.

(4) Information Provision Server

While the information provision server is configured to only provide information required for estimating the imaging position in the embodiment, the information provision server may be configured to perform the estimation processing of the imaging position and the like. That is, the information provision server is configured to perform the estimation processing of the imaging position and the like using the user terminal as an interface. In this case, the information provision server functions as the information processing apparatus. In addition, in this case, the user terminal constitutes another display device.

In addition, the user terminal may have the functions of the information provision server. That is, the functions of the user terminal and the functions of the information provision server may be implemented by one apparatus.

(5) Hardware Configuration

The functions of the user terminal are implemented by various processors. The various processors include a CPU and/or a graphic processing unit (GPU) that is a general-purpose processor functioning as various processing units by executing a program, a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like. The program is synonymous with software.

One processing unit may be composed of one of the various processors or may be composed of two or more processors of the same type or different types. For example, one processing unit may be composed of a plurality of FPGAs or of a combination of a CPU and an FPGA. In addition, a plurality of processing units may be composed of one processor. As an example of a plurality of processing units composed of one processor, first, as represented by a computer used as a client or a server, a form in which one processor is composed of a combination of one or more CPUs and software and the processor functions as a plurality of processing units is possible. Second, as represented by a system on chip (SoC) or the like, a form of using a processor that implements functions of the entire system including a plurality processing units in one integrated circuit (IC) chip is possible. Accordingly, various processing units are configured using one or more of the various processors as a hardware structure.

EXPLANATION OF REFERENCES

1: imaging position estimation system
2: network
10: user terminal
10A: camera information acquisition unit
10B: subject selection unit
10C: subject information acquisition unit
10D: composition setting unit
10E: imaging position estimation unit
10F: result output unit
10G: imaging availability determination unit
10H: composition correction unit
10I: correction reception unit
10J: composition estimation unit
10K: measurement control unit
10L: icon acquisition unit
11: CPU
12: ROM
13: RAM
14: EEPROM
15: display
15A: map display region
15B: information display region

15C: composition setting region
**15*b*1**: first icon display region
**15*b*2**: second icon display region
16: touch panel
17: GPS reception unit
18: camera
19: voice input unit
20: voice output unit
21: communication unit
22: short range wireless communication unit
23: sensor unit
100: information provision server
100A: request reception unit
100B: request processing unit
100C: request processing result output unit
100D: information database
101: CPU
102: ROM
103: RAM
104: HDD
105: display
106: communication unit
107: keyboard
108: mouse
110: optical drive
B1: first search box
B2: second search box
Bt1: Check & Search button
Bt2: Move button
C: circle of radius r centered at point P1
C11: circle of dot-dashed line centered at point P1
C12: circle of solid line centered at point P1
C13: circle of dashed line centered at point P1
C21: circle of dot-dashed line centered at point P2
C22: circle of solid line centered at point P2
C23: circle of dashed line centered at point P2
D2: arrow indicating azimuth at which second subject is to be present
Dx: arrow indicating imaging direction
F: frame
Ic1: icon of first subject
Ic2: icon of second subject
M: map
Me: setting menu
Mx: mark indicating imaging position
OX: obstacle
Ob: subject candidate
P1: position of first subject
P2: position of second subject
PX: imaging position
X1: intersection between circle C21 and circle C22 of solid line
X2: intersection between circle C21 and circle C22 of solid line
f1: first focal length
f2: second focal length
f3: third focal length
fx: focal length
r: radius of circle C
H1: actual height of first subject
h1: height of first subject within composition
h2: height of second subject within composition
w: distance between first subject and second subject within composition
θ: elevation angle
φ: angle
S1 to S9: procedure of estimation processing of imaging position
S11 to S16: processing operation of user terminal

What is claimed is:

1. An information processing apparatus comprising
an imaging apparatus; and
a processor,
wherein the processor is configured to:
acquire information about the imaging apparatus and information about positions and sizes of a first subject and a second subject to be set as an imaging target; and
receive input of composition of a first image representing the first subject and a second image representing the second subject on a display device and/or another display device;
perform a control of estimating an imaging position at which the first subject and the second subject are imageable based on the composition; and
control the imaging apparatus to capture an image of the first subject and the second subject according to the imaging position.

2. The information processing apparatus according to claim 1,
wherein the processor is configured to perform a control of displaying information about the estimated imaging position on the display device and/or the other display device.

3. The information processing apparatus according to claim 1,
wherein the composition is a position and a size of the first image and a position and a size of the second image on the display device and/or the other display device.

4. The information processing apparatus according to claim 1,
wherein the processor is configured to:
receive input of information for specifying the first subject and the second subject; and
perform a control of acquiring the information about the position and the size of the specified first subject and the information about the position and the size of the specified second subject from a database.

5. The information processing apparatus according to claim 1,
wherein the processor is configured to perform a control of acquiring information obtained by measuring the position and the size of the first subject and the position and the size of the second subject.

6. The information processing apparatus according to claim 1,
wherein the processor is configured to:
acquire information about a current location;
generate guidance information for leading to the imaging position based on the acquired information about the current location; and
perform a control of displaying the generated guidance information on the display device and/or the other display device.

7. The information processing apparatus according to claim 1,
wherein the processor is configured to:
calculate a time slot in which backlight and/or insufficiency of a light quantity occurs in a case of imaging the first subject and the second subject at the imaging position; and perform a control of displaying the calculated time slot or a time slot excluding the calculated time slot on the display device and/or the other display device.

8. The information processing apparatus according to claim 1, wherein the processor is configured to, in a case where the imaging position is not estimable, perform a control of performing correction to the composition in which the imaging position is estimable.

9. The information processing apparatus according to claim 1, wherein the processor is configured to perform a control of displaying a frame having the same aspect ratio as an image captured by the imaging apparatus on the display device and/or the other display device.

10. The information processing apparatus according to claim 9, wherein the processor is configured to, in a case where the imaging position is not estimatable because sizes of the first image and the second image in the composition of which input is received are unsuitable, perform a control of performing correction to the composition in which the imaging position is estimatable by changing the size of the first image and the size of the second image within the frame and/or a front and rear positional relationship.

11. The information processing apparatus according to claim 9, wherein the processor is configured to, in a case where the imaging position is not estimatable because a front and rear positional relationship between the first image and the second image in the composition of which input is received is unsuitable, perform a control of performing correction to the composition in which the imaging position is estimatable by changing a size of the first image and a size of the second image within the frame and/or the front and rear positional relationship.

12. The information processing apparatus according to claim 9, wherein the processor is configured to, in a case where the imaging position is not estimatable because a distance between the first image and the second image in the composition of which input is received are unsuitable, perform correction to the composition in which the imaging position is estimatable by changing the distance between the first image and the second image within the frame.

13. The information processing apparatus according to claim 9, wherein the processor is configured to:

detect an obstacle in a case of imaging the first subject and the second subject at the estimated imaging position; and in a case where the obstacle is detected, perform a control of performing correction to the composition in which the first subject and the second subject are imageable by avoiding the obstacle.

14. The information processing apparatus according to claim 9, wherein the processor is configured to further perform a control of receiving input of directions of the first image and the second image within the frame.

15. The information processing apparatus according to claim 1, wherein the processor is configured to:

determine whether or not the estimated imaging position is an enterable location; and perform a control of issuing an alert in a case where the estimated imaging position is an unenterable location.

16. The information processing apparatus according to claim 1, wherein the imaging position includes information about an altitude.

17. The information processing apparatus according to claim 1, wherein the processor is configured to:

determine whether or not the estimated imaging position is a reachable position; and perform a control of issuing an alert in a case where the estimated imaging position is an unreachable position.

18. An information processing apparatus comprising an imaging apparatus; and a processor, wherein the processor is configured to:

acquire information about the imaging apparatus and information about positions and sizes of a first subject and a second subject to be set as an imaging target; and receive input of composition of a first image representing the first subject and a second image representing the second subject on a display device and/or another display;

perform a control of estimating an imaging direction in which the first subject and the second subject are imageable based on the composition; and control the imaging apparatus to capture an image of the first subject and the second subject according to the imaging direction.

19. The information processing apparatus according to claim 18, wherein the processor is configured to perform a control of displaying on the display device, information about the imaging direction, and notifying the information.

20. The information processing apparatus according to claim 1, wherein the information about the position of the first subject and/or the information about the position of the second subject is information about an altitude and an azimuth of the first subject and/or information about an altitude and an azimuth of the second subject.

21. An information processing method comprising:

acquiring information about an imaging apparatus and information about positions and sizes of a first subject and a second subject to be set as an imaging target; and receiving input of composition of a first image representing the first subject and a second image representing the second subject on a display device and/or another display device;

performing a control of estimating an imaging position at which the first subject and the second subject are imageable based on the composition; and controlling the imaging apparatus to capture an image of the first subject and the second subject according to the imaging position.

22. A non-transitory, computer readable tangible recording medium on which a program for causing, when read by a computer, the computer to execute the information processing method according to claim 21 is recorded.

* * * * *